(12) United States Patent
Sha et al.

(10) Patent No.: US 12,133,088 B2
(45) Date of Patent: Oct. 29, 2024

(54) BASE STATION DEVICE, COMMUNICATION METHOD AND STORAGE MEDIUM

(71) Applicant: Sony Group Corporation, Tokyo (JP)

(72) Inventors: Ziyuan Sha, Beijing (CN); Zhaocheng Wang, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 575 days.

(21) Appl. No.: 17/437,052

(22) PCT Filed: Apr. 7, 2020

(86) PCT No.: PCT/CN2020/083558
§ 371 (c)(1),
(2) Date: Sep. 8, 2021

(87) PCT Pub. No.: WO2020/207384
PCT Pub. Date: Oct. 15, 2020

(65) Prior Publication Data
US 2022/0182847 A1    Jun. 9, 2022

(30) Foreign Application Priority Data
Apr. 12, 2019    (CN) .......................... 201910292377.1

(51) Int. Cl.
*H04W 16/28*    (2009.01)
*H04B 17/336*    (2015.01)
(Continued)

(52) U.S. Cl.
CPC .......... *H04W 16/28* (2013.01); *H04B 17/336* (2015.01); *H04W 24/10* (2013.01);
(Continued)

(58) Field of Classification Search
CPC ............. H04W 16/18; H04W 72/1226; H04W 72/1273; H04W 72/0453; H04W 24/10; H04W 72/0446; H04B 17/336
See application file for complete search history.

(56) References Cited

U.S. PATENT DOCUMENTS 9,647,805 B2 *  5/2017  Gerlach ................ H04L 5/0035
9,654,261 B2    5/2017  Lorca Hernando
(Continued)

FOREIGN PATENT DOCUMENTS

CN    101828359 A    9/2010
CN    102014440 A    4/2011
(Continued)

OTHER PUBLICATIONS

International Search Report and Written Opinion mailed on Jul. 7, 2020, received for PCT Application PCT / CN2020/083558, Filed on Apr. 7, 2020, 8 pages including English Translation.
(Continued)

*Primary Examiner* — Parth Patel
(74) *Attorney, Agent, or Firm* — XSENSUS LLP

(57) ABSTRACT

The present disclosure relates to a base station device, a communication method, and a storage medium in a wireless communication system. There is provided a base station device, comprising a processing circuitry configured to: based on a conflicting beam list, determining that at least one conflicting beam is included in a set of transmitting beams to be used for downlink transmission from a local cell in a future specific period; in response to the determining, send beam scheduling information for the future specific period to a base station of an adjacent cell, the beam scheduling information including at least information on time-frequency resources allocated to the at least one conflicting beam by the local cell.

11 Claims, 26 Drawing Sheets

(51) Int. Cl.
  *H04W 24/10*      (2009.01)
  *H04W 72/0446*    (2023.01)
  *H04W 72/0453*    (2023.01)
  *H04W 72/1273*    (2023.01)
  *H04W 72/54*      (2023.01)

(52) U.S. Cl.
  CPC ... *H04W 72/0446* (2013.01); *H04W 72/0453* (2013.01); *H04W 72/1273* (2013.01); *H04W 72/54* (2023.01)

(56) References Cited

U.S. PATENT DOCUMENTS

| | | | |
|---|---|---|---|
| 9,907,093 B2* | 2/2018 | Park | H04W 74/0833 |
| 10,111,230 B2* | 10/2018 | Stirling-Gallacher | H04W 72/541 |
| 11,088,751 B2* | 8/2021 | Davydov | H04B 7/0695 |
| 11,375,527 B1* | 6/2022 | Eyuboglu | H04B 7/15528 |
| 2009/0061842 A1 | 3/2009 | Park | |
| 2010/0033374 A1* | 2/2010 | van Rensburg | H01Q 1/246 342/368 |
| 2013/0115999 A1 | 5/2013 | Sirotkin | |
| 2015/0189568 A1* | 7/2015 | Stanze | H04B 7/0417 370/331 |
| 2015/0215873 A1* | 7/2015 | Jeong | H04W 52/42 455/522 |
| 2016/0270086 A1* | 9/2016 | Stirling-Gallacher | H04W 72/54 |
| 2017/0006613 A1* | 1/2017 | Kakishima | H04B 7/024 |
| 2017/0054534 A1* | 2/2017 | Sang | H04L 5/0032 |
| 2017/0105223 A1* | 4/2017 | Zhang | H04W 72/541 |
| 2017/0163392 A1* | 6/2017 | Lim | H04W 72/0453 |
| 2017/0230164 A1* | 8/2017 | Zhang | H04L 5/0073 |
| 2017/0318491 A1* | 11/2017 | Chen | H04B 7/0617 |
| 2018/0091282 A1* | 3/2018 | Lim | H04L 5/0092 |
| 2018/0227886 A1* | 8/2018 | Chou | H04B 7/0695 |
| 2018/0323848 A1* | 11/2018 | Mizusawa | H04B 7/0626 |
| 2018/0351668 A1* | 12/2018 | Kim | H04L 27/2691 |
| 2018/0376505 A1* | 12/2018 | Zhang | H04L 12/189 |
| 2019/0103906 A1* | 4/2019 | Athley | H04B 7/0695 |
| 2019/0288378 A1* | 9/2019 | DiFonzo | H04W 16/28 |
| 2019/0289500 A1* | 9/2019 | Abedini | H04W 72/044 |
| 2019/0289502 A1* | 9/2019 | Abedini | H04W 8/22 |
| 2019/0327622 A1* | 10/2019 | Sahin | H04W 48/16 |
| 2019/0363810 A1* | 11/2019 | Luo | H04J 11/0053 |
| 2020/0045572 A1* | 2/2020 | Yum | H04W 72/0446 |
| 2020/0260358 A1* | 8/2020 | Ratnam | H04B 7/024 |
| 2020/0322023 A1* | 10/2020 | Kung | H04B 7/088 |
| 2020/0343944 A1* | 10/2020 | Kim | H04B 7/0691 |
| 2021/0051502 A1* | 2/2021 | Yamada | H04B 17/309 |
| 2021/0345141 A1* | 11/2021 | Cao | H04W 24/10 |
| 2021/0409177 A1* | 12/2021 | Hao | H04B 17/345 |
| 2022/0150012 A1* | 5/2022 | Su | H04L 5/0007 |
| 2022/0182847 A1* | 6/2022 | Sha | H04B 7/022 |

FOREIGN PATENT DOCUMENTS

| | | |
|---|---|---|
| CN | 102088735 A | 6/2011 |
| CN | 103688583 A | 3/2014 |
| CN | 103974272 A | 8/2014 |
| CN | 105723771 A | 6/2016 |
| CN | 106160822 A | 11/2016 |
| CN | 107113619 A | 8/2017 |
| CN | 107409397 A | 11/2017 |
| CN | 108337065 A | 7/2018 |
| CN | 105451255 B | 8/2020 |
| EP | 2148546 A1 | 1/2010 |
| KR | 20130029323 A | 3/2013 |
| WO | WO-2013058571 A1 | 4/2013 |

OTHER PUBLICATIONS

Potevio, "Discussion of Interference Coordination for inter-eNB COMP Transmission", 3GPP TSG-RAN WG1 #57, R1-09xxxx, May 4-8, 2009, pp. 1-6.

* cited by examiner

FIG.13

Cell A:

| Front end | Rear end |
|---|---|
| A7 | A5 |
| A8 | A6 |

Cell B:

| Front end | Rear end |
|---|---|
| B8 | |

Cell C:

| Front end | Rear end |
|---|---|
| | C5 |

FIG.16

BASE STATION DEVICE, COMMUNICATION METHOD AND STORAGE MEDIUM

CROSS-REFERENCE TO RELATED APPLICATIONS

The present application is based on PCT filing PCT/CN2020/083558, filed Apr. 7, 2020, which claims priority to Chinese Patent Application No. 201910292377.1, filed on Apr. 12, 2019, the entire contents of each are incorporated herein by reference.

FIELD OF THE INVENTION

The present disclosure generally relates to inter-cell interference coordination (ICIC) in a wireless communication system. More specifically, the present disclosure relates to a wireless communication system, a base station device, a communication method, and a storage medium utilizing beam-based inter-cell interference coordination.

BACKGROUND

Benefiting from a development of wireless communication technology, many application services such as mobile Internet become increasingly popular. In order to provide higher communication quality and capacity, 5G NR (New Radio), which is the next-generation wireless communication standard, uses a higher frequency band, such as a millimeter wave band, and applies large-scale antenna technology and multi-beam system, so as to provide higher system rate and spectral efficiency. The large-scale MIMO (Massive MIMO) further expands the utilization of the space domain, and the beamforming technology withstands the large path loss in the high-frequency channel by forming a narrow directional beam. They have become key technologies for the 5G communication.

However, in a large-scale MIMO system, although a signal-to-noise ratio (SNR) on the receiving side can be significantly improved by beamforming gain, interferences from adjacent cells are also enhanced due to beamforming, thereby Inter-Cell Interference (ICI) is still a basic limit in the 5G communication system.

At present, there are some ways to manage the inter-cell interference. For example, the inter-cell interference coordination method applied in the existing LTE communication system is primarily based on coordination of time-frequency resources between Cell And its adjacent cells, for example, user equipment (UE) on the edge of the cell that may be interfered is scheduled into time-frequency resources of the adjacent cells that have small transmit power.

However, the existing inter-cell interference coordination methods are mainly for non-large-scale MIMO systems. Non-large MIMO systems (e.g., the LTE system) scheduling users in time and frequency dimensions, and there is no resource for the spatial dimension. With respect to the large-scale MIMO systems, such inter-cell interference coordination works on the entire set of beams of the cell, although the interference from the adjacent cells is only a small number of beams of adjacent cells, resulting in an adverse effect on the efficiency of the communication system.

Therefore, there is a need to moderate inter-cell interference by utilizing beam-based resource scheduling coordination.

SUMMARY OF THE INVENTION

The present disclosure provides an inter-cell interference coordination technology suitable for the large-scale MIMO systems. The above need is met by applying one or more aspects of the present disclosure.

A brief overview of the present disclosure is given below to provide a basic understanding on some aspects of the present disclosure. However, it will be appreciated that the overview is not an exhaustive description of the present disclosure. It is not intended to specify key portions or important portions of the present disclosure, nor to limit the scope of the present disclosure. It aims at merely describing some concepts about the present disclosure in a simplified form and serves as a preorder of a more detailed description to be given later.

According to an aspect of the present disclosure, there is provided a base station device, comprising: a processing circuitry configured to: based on a conflicting beam list, determine that at least one conflicting beam is included in a set of transmitting beams to be used for downlink transmission from a local cell in a future specific period; in response to the determining, send beam scheduling information for the future specific period to a base station of an adjacent cell, the beam scheduling information including at least information on time-frequency resources allocated to the at least one conflicting beam by the local cell.

According to an aspect of the present disclosure, there is provided a base station device, comprising a processing circuitry configured to receive beam scheduling information for a future specific period from a base station of an adjacent cell, the beam scheduling information including information on time-frequency resources allocated to at least one adjacent-cell beam by the adjacent cell; based on a conflicting beam list, determine that at least one conflicting beam associated with the at least one adjacent-cell beam is included in a set of transmitting beams to be used for downlink transmission from a local cell in the future specific period; and in response to the determining, based on the beam scheduling information, allocate time-frequency resources to the at least one conflicting beam.

According to an aspect of the present disclosure, there is provided a wireless communication system, comprising: UE; a first base station; and a second base station, wherein the UE is connected to a first cell corresponding to the first base station and interfered by a second cell corresponding to the second base station, wherein the first base station, based on a conflicting beam list, determines that at least one first transmitting beam to be used for downlink transmission to the UE in a future specific period is a conflicting beam; in response to the determining, sends beam scheduling information for the future specific period to the second base station, the beam scheduling information including at least information on time-frequency resources allocated to the at least one first transmitting beam by the first cell, and wherein the second base station receives the beam scheduling information from the first base station; based on a conflicting beam list of the second cell, determines that at least one second transmitting beam to be used for downlink transmission from the second cell in the future specific period is a conflicting beam associated with the at least one first transmitting beam; and in response to the determining, based on the beam scheduling information, allocates time-frequency resources to the at least one second transmitting beam.

According to an aspect of the present disclosure, there is provided a communication method, comprising: based on a conflicting beam list, determining that at least one conflicting beam is included in a set of transmitting beams to be used for downlink transmission from a local cell in a future specific period; in response to the determining, sending beam scheduling information for the future specific period to a base station of an adjacent cell, the beam scheduling information including at least information on time-frequency resources allocated to the at least one conflicting beam by the local cell.

According to an aspect of the present disclosure, there is provided a communication method, comprising: receiving beam scheduling information for a future specific period from a base station of an adjacent cell, the beam scheduling information including information on time-frequency resources allocated to at least one adjacent-cell beam by the adjacent cell; based on a conflicting beam list, determining that at least one conflicting beam associated with the at least one adjacent-cell beam is included in a set of transmitting beams to be used for downlink transmission from a local cell in the future specific period; and in response to the determining, based on the beam scheduling information, allocating time-frequency resources to the at least one conflicting beam.

According to an aspect of the present disclosure, there is provided a non-transitory computer readable storage medium storing executable instructions which, when executed, implements any of the above methods.

Embodiments of the present disclosure provide a beam-based inter-cell inference coordination which reduces or eliminates the inter-cell interference while maintaining a high communication efficiency.

DESCRIPTION OF THE DRAWINGS

A better understanding of the present disclosure may be achieved by referring to a detailed description given hereinafter in connection with accompanying drawings, wherein the same or similar reference signs are used to indicate the same or similar elements throughout the drawings. The drawings are included in the specification and form a part of the specification along with the following detailed descriptions, for further illustrating embodiments of the present disclosure and for explaining the theory and advantages of the present disclosure. Wherein

FIG. 13 illustrates a possible beam scheduling scheme for Cell A;

FIG. 16 illustrates a diagram of storing a scheduling tendency for conflicting beams in each cell;

Further features of the present invention will become apparent from the following description of exemplary embodiments with reference to the attached drawings.

DETAILED DESCRIPTION OF PREFERRED EMBODIMENTS

Various illustrative embodiments of the present disclosure will be described hereinafter with reference to the drawings. For purpose of clarity and simplicity, not all features are described in the specification. Note that, however, many settings specific to the implementations can be made according to specific requirements in practicing the embodiments of the present disclosure, so as to achieve specific goals of the developers, for example, to comply with the limitations related to apparatus and service, and these limitations may vary from implementations. Furthermore, it will be also appreciated that the developing work will be a routine task, despite complex and tedious, for those skilled in the art who benefit from the present disclosure.

In addition, it should be noted that the figures illustrate only steps of a process and/or components of a device that are closely related to the technical solutions according to the present disclosure, and omit other details that are in little relation to the invention. The following description of illustrative embodiments are merely explanatory and should not be regarded as any limitation to the scope of the present disclosure and the applications thereof.

For convenient explanation of the technical solutions of the present disclosure, various aspects of the present disclosure will be described below in the context of the 5G NR. However, it should be noted that this is not a limitation on the scope of application of the present disclosure. One or more aspects of the present disclosure can also be applied to wireless communication systems that have been commonly used, such as 4G LTE/LTE-A, or various wireless communication systems to be developed in future. The architecture, entities, functions, processes and the like as described in the following description are not limited to those in the NR communication system, but can be found in other communication standards.

[Overview]

Figure 1:
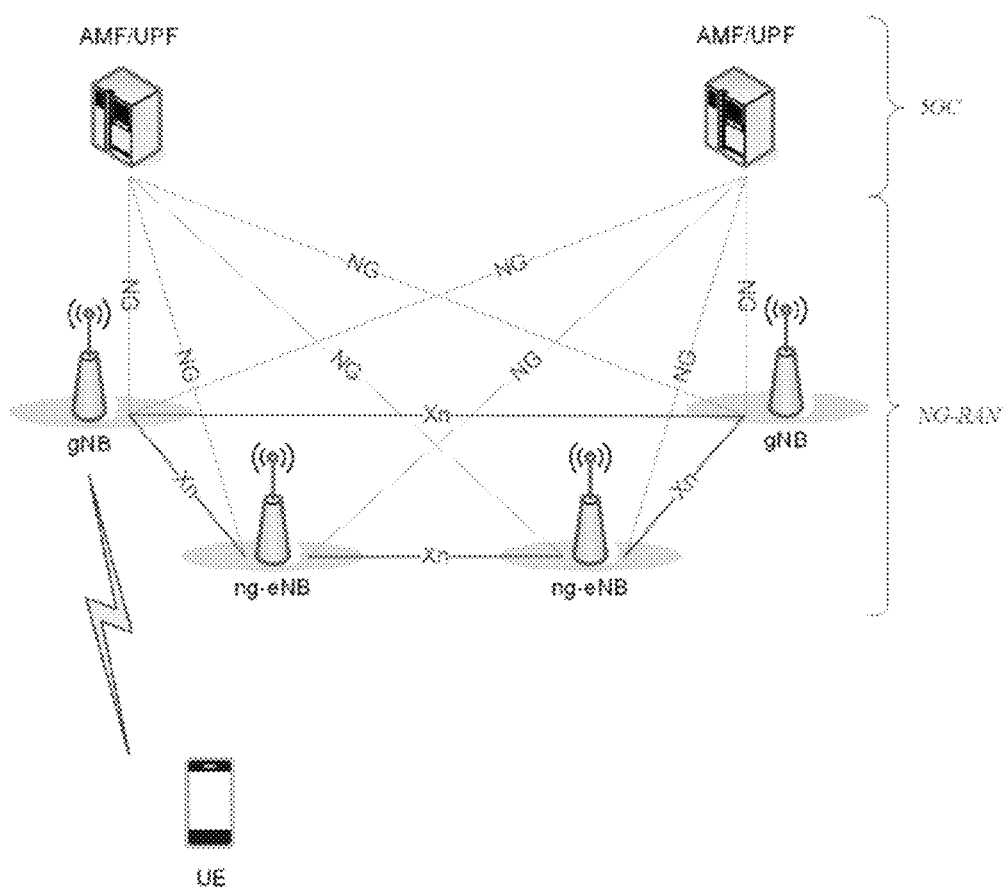
FIG. 1 is a simplified diagram of architecture of the NR communication system.

FIG. 1 is a simplified diagram showing the architecture of the 5G NR communication system. As shown in FIG. 1, on the network side, the radio access network (NG-RAN) nodes of the NR communication system include gNB and ng-eNB, wherein gNB is a newly defined node in the 5G NR communication standard, and it is connected to 5G core network (5GC) via a NG interface, and provides the NR user plane and control plane protocols terminating with terminal equipment (also referred to as "user equipment", hereinafter referred to as "UE"); ng-eNB is a node defined to be compatible with the 4G LTE communication system, and it can be upgradation of evolved Node B (eNB) of the LTE radio access network, connects a device to the 5G core network via the NG interface, and provides user plane and control plane protocols of an evolved universal terrestrial radio access (E-UTRA) terminating with the UE. Hereinafter, the gNB and ng-eNB are collectively referred to as "base station".

However, it should be noted that the term "base station" used in the present disclosure is not limited to the above two types of nodes, but covers various control device on the network side, and has the full breadth of its usual meaning. For example, in addition to the gNB and ng-eNB specified in the 5G communication standard, depending on the scenario in which the technical solution of the present disclosure is applied, the "base station" may also be, for example, an eNB in the LTE communication system, a remote radio head, a wireless access point, a drone control tower, a control node in an automated factory, or a communication device that performs similar functions, or an element thereof. Application examples of the base station will be described in detail in the following chapter.

The coverage of the base station can be referred to as "cell." The "cell" used in the present disclosure includes various types of cells, for example, depending on the transmit power and coverage of the base station, the cells may include macro cells, micro cells, pico cells, home cells, and the like. The cell is usually identified by a cell number (cell-id). Typically, there is one-to-one correspondence between a base station and a cell, but other correspondence between the base station and the cell is possible. It should be understood that when the behavior of the cell is described in the present disclosure, "cell" and "base station" are often used interchangeably for ease of understanding, although these behaviors are actually completed by the base station.

In addition, in the present disclosure, the term "UE" has the full breadth of its usual meaning, including various terminal devices or in-vehicle devices that communicate with the base station. As an example, the UE may be a terminal device such as a mobile phone, a laptop computer, a tablet computer, an in-vehicle communication device, a drone, a sensor and an actuator in an automated factory, or an element thereof. Application examples of the UE will be described in detail in the following chapter.

Figure 2A:
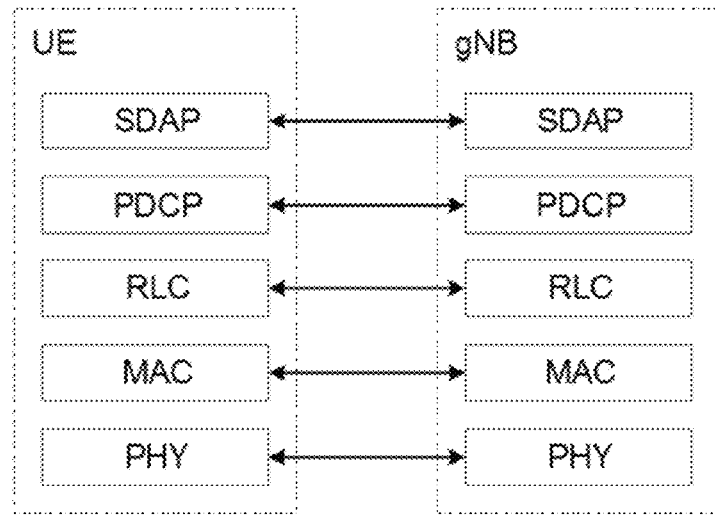
FIGS. 2A and 2B are NR radio protocol architectures of the user plane and control plane, respectively.
Figure 2B:
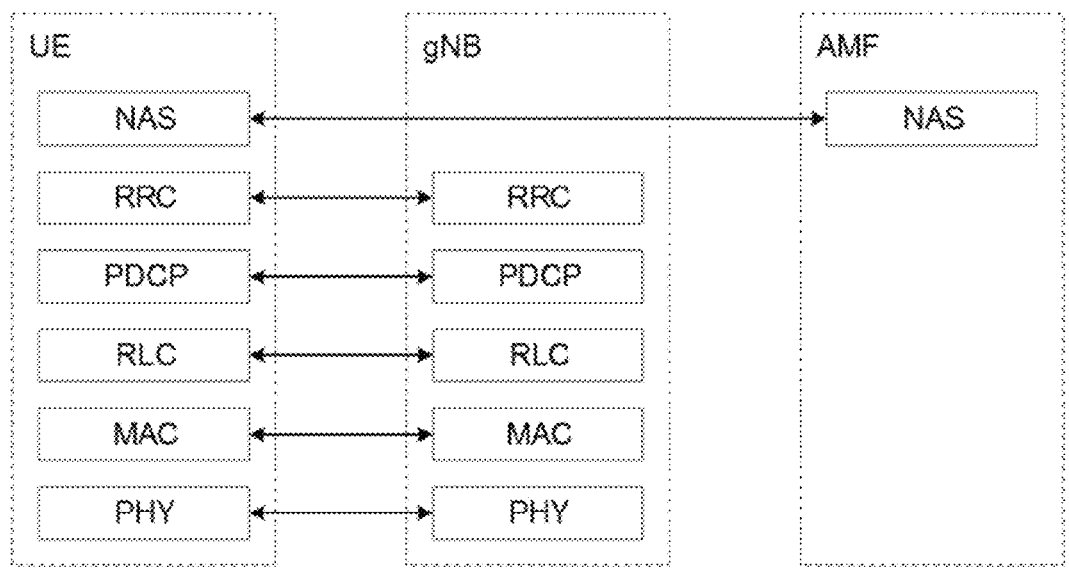

Next, the NR radio protocol architecture for the base station and UE in FIG. 1 will be introduced with reference to FIGS. 2A and 2B. FIG. 2A shows the radio protocol stack for the user plane of UE and gNB, and FIG. 2B shows the radio protocol stack for the control plane of UE and gNB. The radio protocol stack can include the following three layers: Layer 1, Layer 2, and Layer 3.

Layer 1 (L1) is the lowest layer and implements various physical-layer signal processing to provide a transparent transmission function of signals. The L1 layer will be referred to herein as physical layer (PHY).

In Layer1, various signal processing functions of the physical layer are implemented by the base station side, including coding and interleaving to facilitate forward error correction (FEC) at the UE, and mapping to signal constellations based on various modulation schemes (for example, Binary Phase Shift Keying (BPSK), Quadrature Phase Shift Keying (QPSK), M-Phase Shift Keying (M-PSK), M-Quadrature Amplitude Modulation (M-QAM)). Subsequently, the coded and modulated symbols are split into parallel streams. Each of the streams is then used with reference signals to generate a physical channel that carries a stream of time-domain symbols. The symbol stream is spatially pre-coded to generate one or more spatial streams. Channel estimation can be used to determine the coding and modulation scheme and for spatial processing. The channel estimation may be derived from the reference signal transmitted by the UE and/or channel state feedback. Each of the spatial streams is then provided to different antennas via a separate transmitter. Each transmitter modulates the RF carrier with its own spatial stream for transmission.

At the UE, each receiver receives the signal with its respective antennas. Each receiver recovers the information modulated on the radio frequency (RF) carrier and provides this information to various signal processing functions of the physical layer. Spatial processing is performed on the information at the L1 layer to recover any spatial stream destined for the UE. If there are multiple spatial streams destined for the UE, they can be combined into a single symbol stream. This symbol stream is then converted from the time domain to the frequency domain. By determining the signal constellation points which are the most likely to be transmitted by the base station, each of the symbols and the reference signal are recovered and demodulated. These soft decisions can be based on the channel estimation. These soft decisions are then decoded and de-interleaved to recover the data and control signals originally transmitted by the base station on the physical channel. These data and control signals are then provided to higher-level processing.

Layer 2 (L2) is above the physical layer and is responsible for managing a wireless link between the UE and the base station. In the user plane, L2 includes a medium access control (MAC) sublayer, a radio link control (RLC) sublayer, a packet data convergence protocol (PDCP) sublayer, and a service data adaptation protocol (SDAP) sublayer. In addition, in the control plane, L2 includes a MAC sublayer, an RLC sublayer, and a PDCP sublayer. These sublayers have the following relationships: the physical layer provides transmission channels for the MAC sublayer, the MAC sublayer provides logical channels for the RLC sublayer, the RLC sublayer provides RLC channels for the PDCP sublayer, and the PDCP sublayer provides radio bearers for the SDAP sublayer. In particular the MAC sublayer is responsible for allocating various radio resources (for example, time-frequency resource block) in a cell to respective UEs.

In the control plane, radio resource control (RRC) sublayer in Layer 3 (L3) is also included in the UE and the base station. The RRC layer is responsible for obtaining radio resources (i.e., radio bearers) and for configuring the lower layers using RRC layer signaling between the base station and the UE. In addition, the non-access stratum (NAS) control protocol in the UE performs functions such as authentication, mobility management, and security control.

In order to support the application of massive MIMO technology, the base station and the UE both have many antennas, such as dozens, hundreds or even thousands of antennas. For the antenna model, a three-level mapping relationship is generally defined around the antennas, so that it can successfully undertake the channel model and the communication standard.

The bottom level is the most basic physical units—antennas (also called antenna elements). Each of the antenna array elements radiates electromagnetic waves according to its own amplitude parameter and phase parameter.

The antenna elements are arranged into one or more antenna arrays in form of matrix. An antenna array can be composed of an entire row, an entire column, multiple rows, and multiple columns of antenna array elements. In this level, each antenna array actually constitutes a Transceiver Unit (TXRU). Each TXRU can be configured independently. By configuring the amplitude parameters and/or phase parameters for the antenna elements that make up the TXRU to adjust the TXRU antenna pattern, the electromagnetic wave radiations emitted by all the antenna elements in the antenna array form a narrow beam pointing to a specific spatial direction, that is, beamforming is implemented.

Finally, an antenna port seen at the system level is formed by one or more TXRUs via logical mapping. "Antenna port" is defined such that a channel on which symbols of a certain antenna port can be inferred from a channel on which another symbol of the same antenna port.

The process of transmitting data by the base station or the UE using the antenna array is briefly described below. First, baseband signals representing a user data stream are mapped onto m (m≥1) radio frequency links by digital precoding. Each of the radio-frequency links up-converts the baseband signal to obtain a radio-frequency signal, and transmits the radio-frequency signal to the antenna array of the corresponding antenna port. The antenna array performs the beamforming on the radio-frequency signal by adjusting the amplitude and phase to form a narrow beam aligning with the transmitting direction, and this process can also be referred to as "analog precoding". An antenna array receives the beam with an opposite procedure. In one example, the analog beamforming parameters can be embodied as a spatial domain filter, and in this case, a particular spatial domain transmitting filter corresponds to "a transmitting beam" used on the transmitting side, and a particular spatial domain receiving filter corresponds to "a receiving beam" used on the receiving side.

Further, by performing the digital precoding operation at the level of antenna port, more flexible digital beamforming is achieved, for example, a multi-stream or multi-user transmission is achieved by precoding for a single user or multiple users.

By using the beamforming, the radiated energy can be mainly concentrated in a particular direction, forming a spatial beam having a narrow directionality to provide a strong power coverage in the particular direction, thereby confronting the path loss existing in a high-frequency channel. In order to achieve cell coverage, the base station and the UE need to support multiple beams. Taking the base station as an example, the base station may have an available beam set including beams with many different directions, each beam having a different azimuth and elevation angle, so that the base station can achieve Cell C overage by scheduling beams.

For UE served by the base station, the base station can select a beam that best matches the wireless channel between the base station and the UE from its beam set, by scanning of the beams or estimation of the channel direction. The selected beam can be used to transmit data from the UE, unless the channel environment changes or the UE is moving beyond the coverage of this beam, then the base station can reselect the best matching beam.

When the UE is at the edge of the cell, downlink transmission for the UE may be interfered by signals from adjacent cells. In particular, between two cells for which the frequency resources are multiplexed, the same time-frequency resource block may be allocated to different UEs in the two cells, resulting in an interference with each other.

In a non-large-scale MIMO system, for example, in the LTE communication system using a relatively low frequency band, the beam radiated by the base station tends to be wide and omni-directional, and the interference to the UE at the edge of the cell exists persistently from the adjacent cell. In order to avoid the inter-cell interference, according to the traditional inter-cell interference coordination methods, when a cell is transmitting with a certain time-domain resource and/or frequency-domain resource, one or more adjacent cells are typically made be silent on the time-domain and/or frequency-domain resource.

However, such resource coordination method based on a cell will work on the entire beam set of the cell, which inevitably causes the communication rate loss of the silent cell and the efficiency of the entire communication system.

Figure 3A:
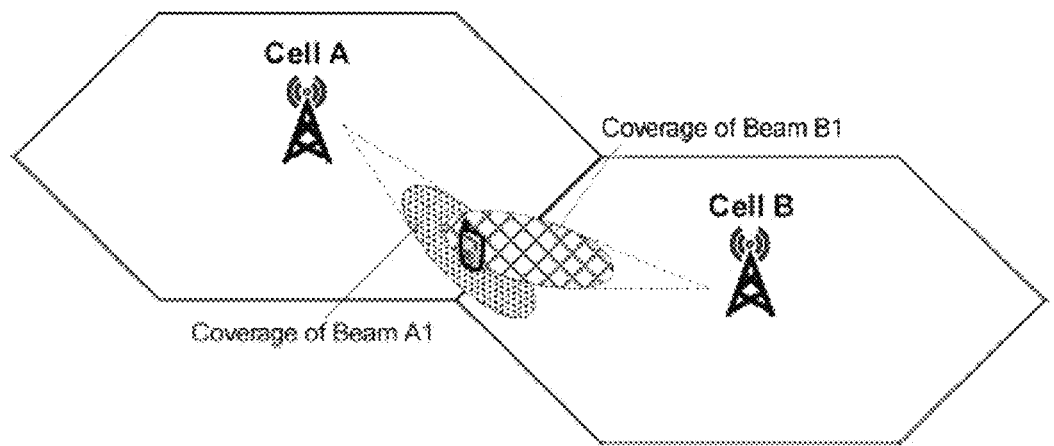
FIGS. 3A and 3B exemplify cases where a beam conflict and no beam conflict occurs between two adjacent cells, respectively.
Figure 3B:
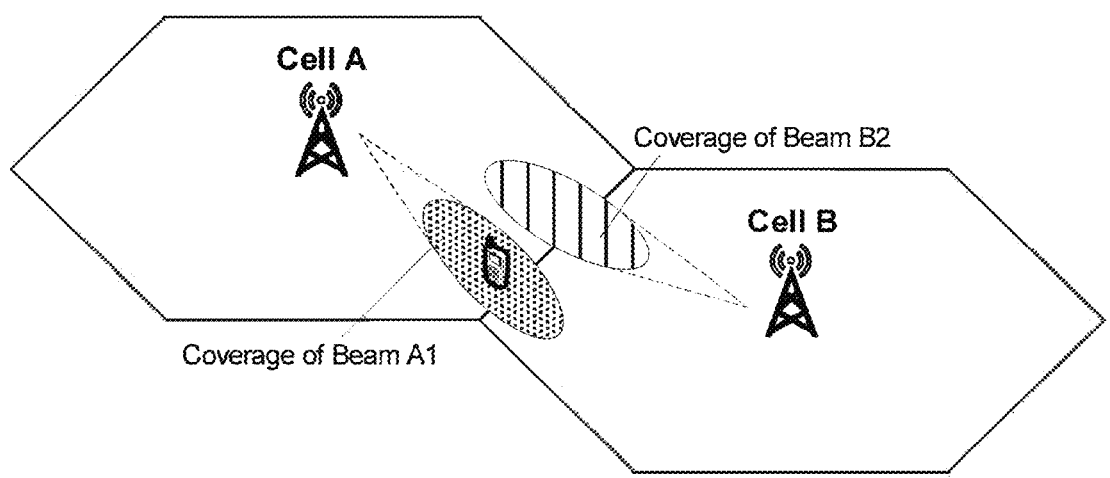

In a large-scale MIMO system, the directivity of beam signals using the millimeter waveband is higher, but the coverage is smaller, and occurrence of the inter-cell interference needs to not only meet conditions in the time dimension and the frequency dimension, but also meet conditions in the space dimension. As shown in FIG. 3A, a UE in Cell A is located at the edge of Cell A, and its downlink transmission is provided by Beam A1 of Cell A, and meanwhile, Beam B1 of Cell B can also cover the position where the UE is located, so that the UE may receive a high interference signal from Cell B. In contrast, as shown in FIG. 3B, the direction of Beam B2 of Cell B is different from Beam B1, and does not cover the position where the UE is located, so the UE is not interfered by Cell B.

It can be seen that in a large-scale MIMO system, the interference by an adjacent cell to the UE is closely related to a small number of beams used in the adjacent cell, and the coverages of these beams are overlapped with the coverages of the beams of the local cell, or it can be said that the beams of the two cells are conflicting in space.

In the present disclosure, if a beam of a certain cell is conflicting with a beam of its adjacent cell, that is, the coverages of the two beams have an overlap, then this pair of beams are "conflicting beams". Since the coverages are overlapping, the interference effect of the pair of conflicting beams is generally mutual. For example, in the example shown in FIG. 3A, Beam A1 of Cell A and Beam B1 of Cell B constitute a pair of conflicting beams, and for the UE of Cell A, Beam A1 of Cell A is an interfered beam and Beam B1 of Cell B is an interfering beam, and for a UE (not shown) at the edge of Cell Be, Beam A1 of Cell A is an interfering beam, and Beam B1 of Cell B is an interfered beam. It should be understood that "interfering" and "interfered" are relative to which cell the UE is in. Thus, as used in the present disclosure, a conflicting beam of a certain cell includes both a beam that is interfered by adjacent cells, as well as a beam that interferes the adjacent cells. Of course, considering a difference in signal power between the beams, there may be a case that a weak beam of a certain cell is interfered by a strong beam of an adjacent cell but hardly interferes the adjacent cell, or a strong beam of a certain cell interferes an adjacent cell but is hardly interfered by a weak beam of the adjacent cell, and such beams are also belonging to the conflicting beams discussed in the present disclosure.

Based on the above discussion, in the large-scale MIMO system, it is a necessary condition for the inter-cell interference that beams of different cells are conflicting, that is, if the coverages are overlapping, it is possible to generate the inter-cell interference, and if there is no overlap between the coverages, no inter-cell interference is generated.

The present disclosure proposes a cell-based inter-cell interference coordination, which is intended to achieve flexible scheduling of resources in the beam level rather than in the cell level, and to avoid occurrence of the inter-cell interference by avoiding beam conflicts.

Figure 4A:
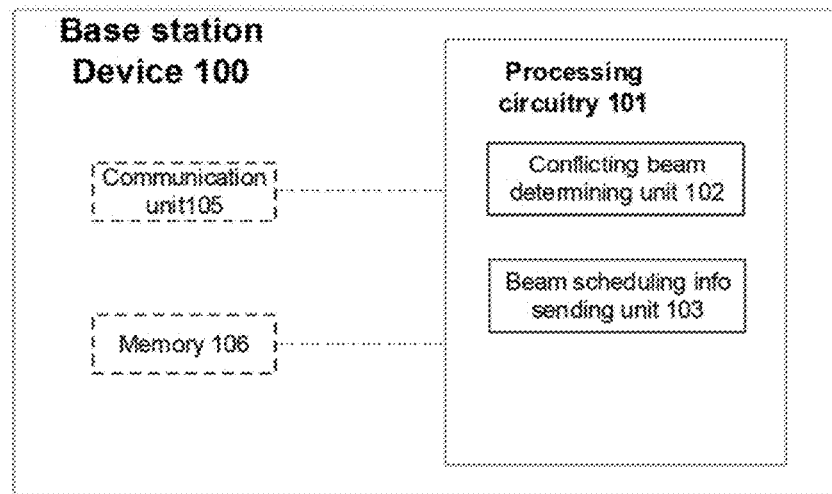
FIG. 4A illustrates a block diagram of a base station device according to the present disclosure.
Figure 4B:
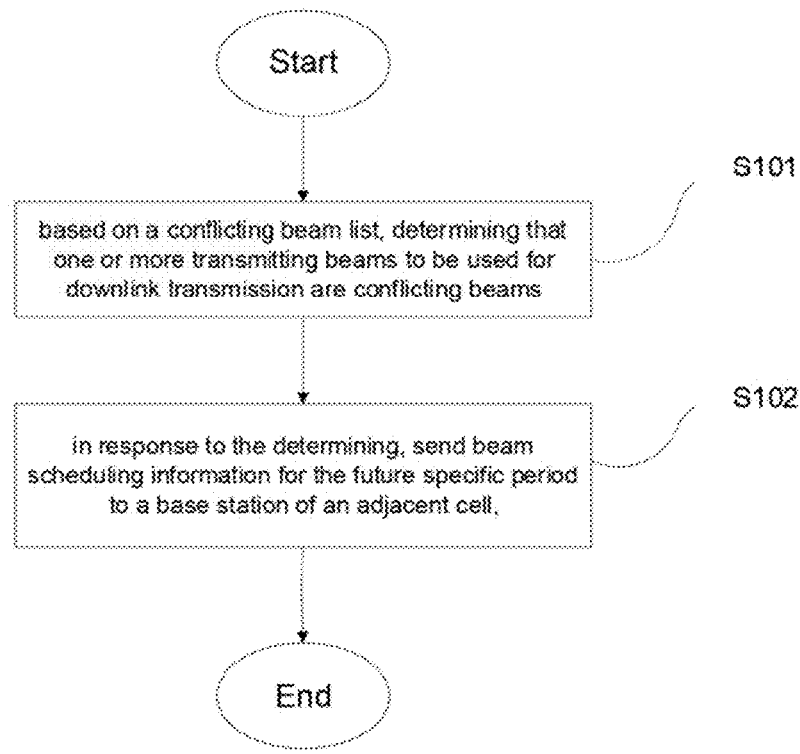
FIG. 4B illustrates a flow chart of a communication method according to the present disclosure.

FIGS. 4A and 4B illustrate the base station device and the communication method thereof according to the present disclosure, respectively. FIG. 4A illustrates a block diagram of a base station device 100 according to the present disclosure. The base station device 100 can be implemented as a device or electronic component in a base station. The base station device 100 can perform an inter-base-station communication with a base station device 200 to be described below.

As shown in FIG. 4A, the base station device 100 includes a processing circuitry 101, and the processing circuitry 101 includes at least a conflicting beam determining unit 102 and a beam scheduling information sending unit 103. The processing circuitry 101 can be configured to perform a communication method shown in FIG. 4B. The processing circuitry 101 may refer to various implementations of a digital circuitry, an analog circuitry, or a mixed signal (combination of analog signal and digital signal) circuitry that performs functions in a computing system. The processing circuitry may include, for example, circuits such as integrated circuit (IC), application specific integrated circuit (ASIC), a part or circuit of an individual processor core, an entire processor core, an individual processor, a programmable hardware device such as field programmable array (FPGA)), and/or a system including multiple processors.

The conflicting beam determining unit 102 of the processing circuitry 101 is configured to determine that at least one conflicting beam is included in a set of transmitting beams to be used for downlink transmission from a local cell in a future specific period based on a conflicting beam list (i.e., perform Step S101 in FIG. 4B). In some embodiments, the conflicting beam list indicates a set of conflicting beams of the local cell involved in an inter-cell interference between the local cell and a certain adjacent cell, and in other embodiments, the conflicting beam list indicates a set of conflicting beams of the local cell and a set of conflicting beams of the adjacent cell involved in the inter-cell interference between the local cell and the adjacent cell. The above-mentioned future specific period corresponds to a resource scheduling period, for example, a time slot.

If the conflicting beam determining unit 102 determines that a conflicting beam is included in the set of transmitting beams scheduled for the future specific period, beam scheduling information for the future specific period is sent by the beam scheduling information sending unit 103 to a base station of the adjacent cell (i.e., perform step S102 in FIG. 4B). The beam scheduling information includes at least information about time-frequency resources allocated by the local cell to the determined at least one conflicting beam. The time-frequency resources may include a set of time-domain resources such as a set of continuous OFDM symbols, or a set of frequency-domain resources such as a set of continuous subcarriers within the above future specific period. In some embodiments, the beam scheduling information may indicate which time-domain resources or frequency-domain resources are allocated by the local cell to the conflicting beam. In other embodiments, the beam scheduling information may indicate whether the time-domain resources allocated by the local cell to the conflicting beam is close to the front end or rear end of the set of time-domain resources, or whether the frequency-domain resources allocated by the local cell to the conflicting beam is close to the front end or rear end of the set of frequency-domain resources. By receiving and referring to such beam scheduling information, the base station of the adjacent cell can avoid scheduling the same time-domain resources or frequency-domain resources to beams that are conflicting with each other as much as possible, thereby reducing beam conflicts to alleviate the inter-cell interference.

The base station device 100 may also include, for example, a communication unit 105. The communication unit 105 can be configured to communicate with the base station of the adjacent cell (for example, the base station device as 200 described below) under the control of the processing circuitry 101. In one example, the communication unit 105 can be implemented as a transceiver, including communication components such as antenna array and/or radio frequency link. The communication unit 105 is depicted by a broken line because it may also be located outside the electronic device 100. The communication unit 105 can be used to send the beam scheduling information to the base station of the adjacent cell.

The base station device 100 may also include a memory 106. The memory 106 can store various data and instructions, such as programs and data for operation of the base station device 100, various data generated by the processing circuitry 101, the conflicting beam list, the beam scheduling information sent by the communication unit 105, and the like. The memory 106 is depicted in a broken line because it may also be located within processing circuitry 101 or outside of the base station device 100. The memory 106 can be a volatile memory and/or non-volatile memory. For example, the memory 106 may include, but is not limited to, a random storage memory (RAM), a dynamic random memory storage (DRAM), a static random access memory (SRAM), a read-only memory (ROM), or a flash memory.

Figure 5A:
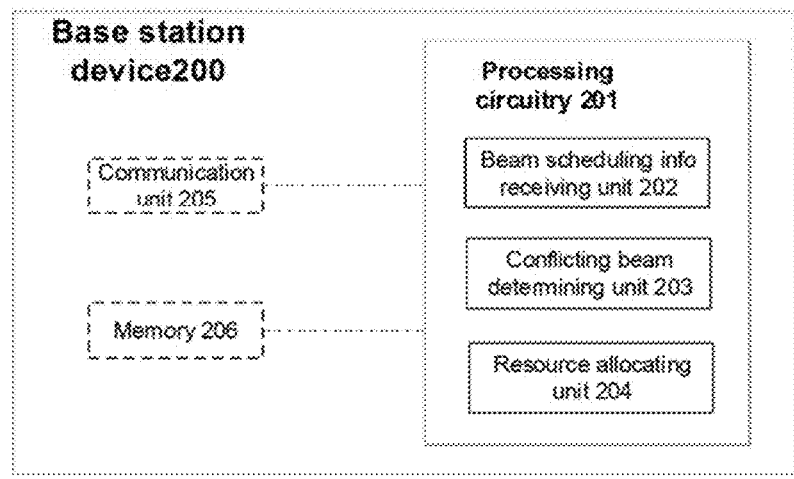
FIG. 5A illustrates a block diagram of a base station device according to the present disclosure.
Figure 5B:
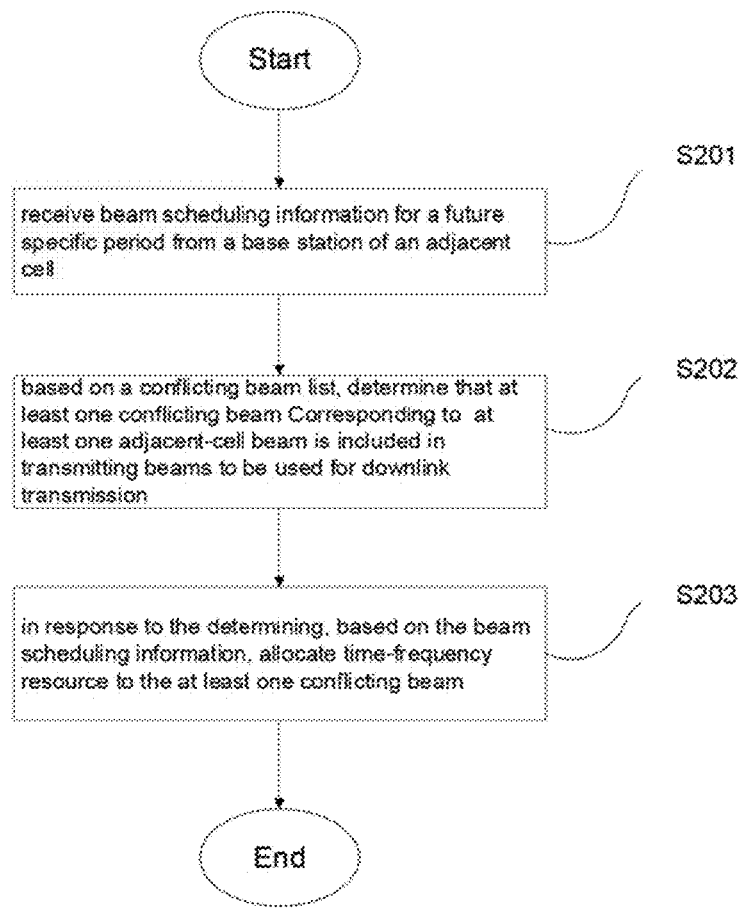
FIG. 5B illustrates a flow chart of a communication method according to the present disclosure.

FIGS. 5A and 5B illustrate a base station device and a communication method thereof according to the present disclosure, respectively. FIG. 5A illustrates a block diagram of a base station device 200 according to the present disclosure. The base station device 200 can be implemented as a device or electronic component in a base station. The base station device 200 can perform inter-base-station communications with the base station device 100 described above.

As shown in FIG. 5A, the base station device 200 includes a processing circuitry 201, and the processing circuitry 201 includes at least a beam scheduling information receiving unit 202, a conflicting beam determining unit 203, and a resource allocating unit 204. The processing circuitry 201 can be configured to perform the communication method shown in FIG. 5B. Similar to the processing circuitry 101, the processing circuitry 201 may refer to various implementations of a digital circuitry, an analog circuitry, or a mixed signal (combination of analog signal and digital signal) circuitry that performs functions in a computing system. The processing circuitry may include, for example, circuits such as integrated circuit (IC), application specific integrated circuit (ASIC), a part or circuit of an individual processor core, an entire processor core, an individual processor, a programmable hardware device such as field programmable array (FPGA)), and/or a system including multiple processors.

The beam scheduling information receiving unit 202 of the processing circuitry 201 is configured to receive beam scheduling information for a future specific period from a base station (e.g., the base station device 100) of an adjacent cell (i.e., perform step S201 in FIG. 5B). The beam scheduling information includes information on time-frequency resources allocated by the adjacent cell to at least one adjacent-cell beam. The time-frequency resources may include a set of time-domain resources such as a set of continuous OFDM symbols, or a set of frequency-domain resources such as a set of continuous subcarriers within the future specific period. The above at least one adjacent cell beam includes a conflicting beam of the adjacent cell. In some embodiments, the beam scheduling information may indicate which time-domain resources or frequency-domain resources are allocated by the adjacent cell to its conflicting beam. In other embodiments, the beam scheduling information may indicate whether the time-domain resources allocated by the adjacent cell to its conflicting beam is close to the front end or rear end of the set of time-domain resources, or whether the allocated frequency-domain resources is close to the front end or rear end of the set of frequency-domain resources.

The conflicting beam determining unit 203 is configured to determine, based on a conflicting beam list, that at least one conflicting beam is included in a set of transmitting beams to be used for downstream transmission from the local cell in the future specific period (i.e., perform step S202 in FIG. 5B). In some embodiments, the conflicting beam list indicates at least a set of conflicting beams of the local cell involved in an inter-cell interference between the local cell and a certain adjacent cell, and in other embodiments, the conflicting beam list indicates a set of conflicting beams of the local cell and a set of conflicting beams of the adjacent cell involved in an inter-cell interference between the local cell and a certain adjacent cell.

If the conflicting beam determining unit 203 determines that conflicting beams are included in the set of transmitting beams scheduled for the future specific period, the resource allocating unit 204 allocates time-frequency resources to those conflicting beams based on the beam scheduling information received by the beam scheduling information receiving unit 202 (i.e., perform step S203 in FIG. 5B). By referring to the beam scheduling information from the adjacent cell, the local cell can avoid allocating the same time-domain resources or frequency-domain resources to beams that are conflicting with each other as much as possible, thereby reducing beam conflicts to alleviate the inter-cell interference.

The base station device 200 may also include, for example, a communication unit 205. The communication unit 205 can be configured to communicate with the base station of the adjacent cell (for example, the base station device 100 as described above) under the control of the processing circuitry 201. In one example, the communication unit 205 can be implemented as a transceiver, including communication components such as antenna array and/or radio frequency link. The communication unit 205 is depicted by a broken line because it can also be located outside the base station device 200. The communication unit 205 can be used to receive the beam scheduling information from the base station of the adjacent cell.

The base station device 200 may also include a memory 206. The memory 206 can store various data and instructions, such as programs and data for operation of base station device 200, various data generated by processing circuitry 201, the conflicting beam list, the beam scheduling information received from communication unit 205, and the like. The memory 206 is depicted by a broken line because it may also be located within the processing circuitry 201 or outside the base station device 200. The memory 206 can be a volatile memory and/or non-volatile memory. For example, the memory 206 may include, but is not limited to, random storage memory (RAM), dynamic random storage (DRAM), static random access memory (SRAM), read-only memory (ROM), or flash memory.

Figure 6:
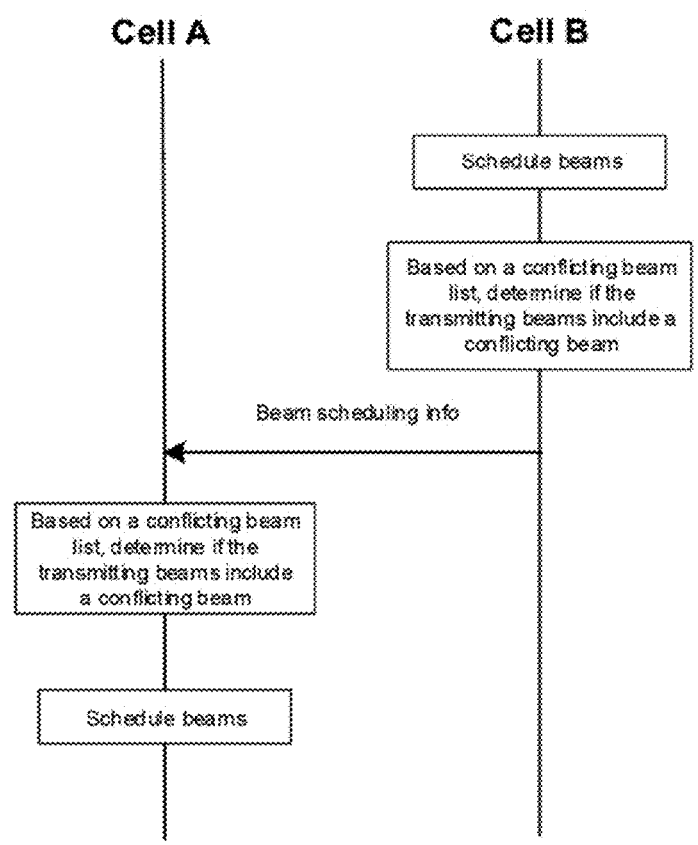
FIG. 6 illustrates an exemplary flow chart of the inter-cell inference coordination according to the present disclosure.

FIG. 6 illustrates a signaling flow diagram of the beam-based inter-cell interference coordination according to the present disclosure. The wireless communication system includes at least Cell A and Cell B that are adjacent. Cell A and Cell B maintain their own conflicting beam lists, respectively.

As shown in FIG. 6, Cell B first determines its beam scheduling scheme for a future specific period, and then Cell B determines if a set of first transmitting beams to be used for the above-mentioned future specific period include a conflicting beam or not, based the conflicting beam list associated with Cell A. If yes, Cell B sends to the adjacent Cell A beam scheduling information, which includes at least information about the time-frequency resources allocated by Cell B to the determined conflicting beam. If no, Cell B does not need to send the beam scheduling information.

When Cell A receives the beam scheduling information from Cell B, Cell A can determine whether a set of second transmitting beams scheduled for downlink transmission within the above future specific period include a conflicting beam associated with the conflicting beam determined by Cell B or not, based on the conflicting beam list associated with Cell B. If Cell B determines that at least one beam scheduled by Cell A is conflicting with the beam scheduled by Cell B after looking up its conflicting beam list, it is required to take the above-mentioned beam scheduling information into account when allocating the time-frequency resources, so as to avoid allocating the same time-frequency resources to beams that are conflicting with each other. On the contrary, if Cell B determines that the beam scheduled by it is not conflicting with the beam scheduled by Cell A, then it can ignore the above beam scheduling information when allocating the time-frequency resources.

Figure 7:
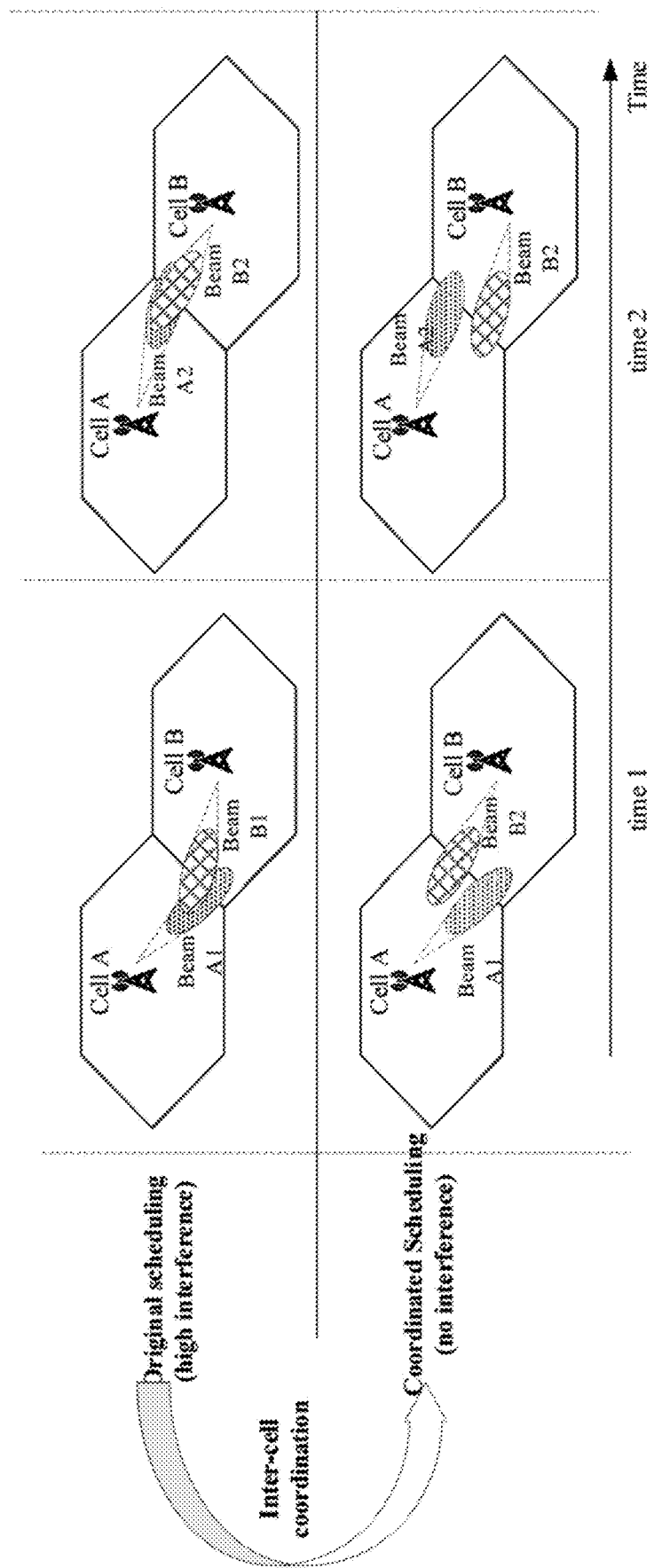
FIG. 7 illustrates a schematic diagram of an effect of the inter-cell interference coordination according to the present disclosure.

FIG. 7 illustrates a schematic diagram of an effect of the inter-cell interference coordination according to the present disclosure. As shown in FIG. 7, according to the original scheduling, Cell A and Cell B use the same resource block (which is time-domain resource in FIG. 7), for example, to transmit respectively Beam A1 and Beam B1, for example, at time 1 of FIG. 7, and to transmit respectively Beam A2 and Beam B2 at time 2, and this scheduling scheme may have high inter-cell interferences due to beam conflicts. With the inter-cell coordination according to the present disclosure, Cell A and Cell B transmit respectively Beam A1 and Beam B2 at time 1, and transmit respectively Beam A2 and Beam B1 at time 2. Such scheduling scheme avoids the beam conflicts, so that no inter-cell interference occurs while no loss is caused to the communication rates.

The technical solution of the present disclosure can maintain a high communication efficiency while alleviating the inter-cell interference, compared to the coordination based on cell silence.

Exemplary embodiments of the present disclosure will be described in detail below with reference to the accompanying drawings.

First Embodiment

According to the first embodiment of the present disclosure, the base station of a cell determines whether or not the downlink transmitting beam to be scheduling is a conflicting beam, and performs the resource coordination with the adjacent cell only with respect to the conflicting beam.

The determining of whether the transmitting beam is a conflicting beam is based on the conflicting beam list. For each of adjacent cells around the cell, the conflicting beam list associated with the adjacent cell can be maintained, where the recorded conflicting beams all overlap with the beams of the adjacent cell.

Figure 8:
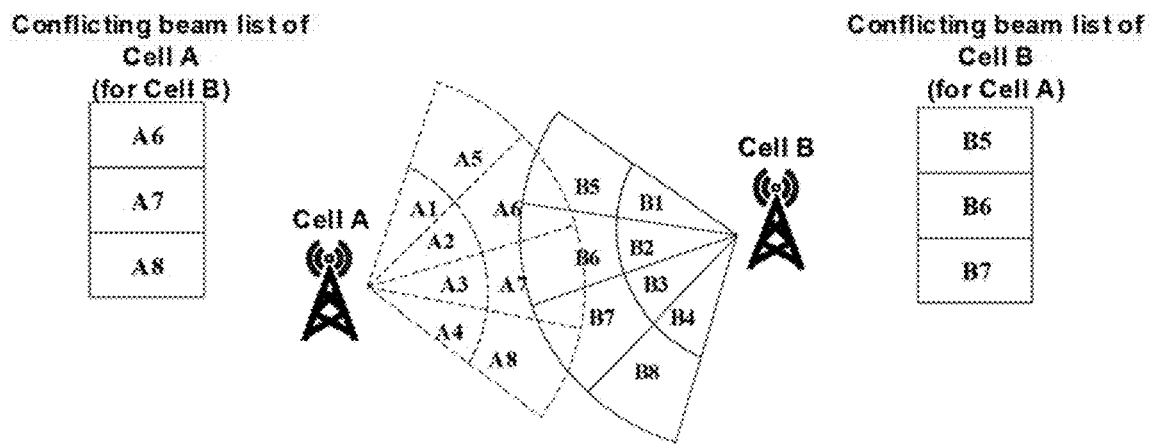
FIG. 8 illustrates an example of a conflicting beam list according to a first embodiment.

FIG. 8 illustrates an example of the conflicting beam list according to the first embodiment. As shown in FIG. 8, Cell A and Cell B are adjacent cells, and Cell A uses transmitting beam (indexed by A1 to A8, respectively) with 4×2 directions, 4 different azimuth angles and 2 different elevation angles, respectively. The coverage of each beam is represented by the area where the corresponding index is located, and similarly, Cell B uses 8 transmitting beams (indexed by B1-B8, respectively), and the coverage of each beam is represented by the area where the corresponding index is located. It should be understood that the number, indexing manner, and coverage of the beams shown in FIG. 8 are merely exemplary.

Partial beams of the two cells have overlapped coverage. For example, Beam A6 of Cell A is overlapped with the coverage of Beam B5 of Cell B, and the user of Cell A or Cell B may be subjected to interference from the adjacent cell when in the overlapped coverage area. Therefore, Beam A6 of Cell A and Beam B5 of Cell B are conflicting beams of their respective cells, and are included in the conflicting beam lists of their respective cells. Further, Beam B6 of Cell B is also overlapped with the coverage of Beam A6 of Cell A, and the user of Cell A or Cell B may be subjected to interference from the adjacent cell when in the overlapped coverage area. Therefore, Beam B6 of Cell B is also a conflicting beam of Cell B, and is included in the conflicting beam list of Cell B.

In the example shown in FIG. 8, Beams A6 to A8 of Cell A all are conflicting beams, and thus are recorded in the conflicting beam list of Cell A, and Beam A5 is not overlapped with the coverage of any beam of Cell B, and thus is not a conflicting beam. Similarly, Beams B 5 to B7 of Cell B all are conflicting beams, and are recorded in the conflicting beam list of Cell B, while Beam B8 is not a conflicting beam.

The base station uses beam indexes to identify and record the beams. As an example, the beam index may be an identifier of a reference signal corresponding to the beam, for example, an identifier (SSBRI) of synchronization signal and physical broadcast signal block (SSB) resource or an identifier (CRI) of channel state information (CSI) resource. Alternatively, the beam index may be the number of each beam in the beam set inside the base station. Various indexing manners are feasible, as long as the base station can identify the corresponding beam through the beam index. In the first embodiment of the present disclosure, one base station cannot recognize the beam index employed by another base station. In the present disclosure, the beam index may user simple numbers A1 to A8, but it should be understood that the beam indexing manner is not limited thereto.

Figure 9A:
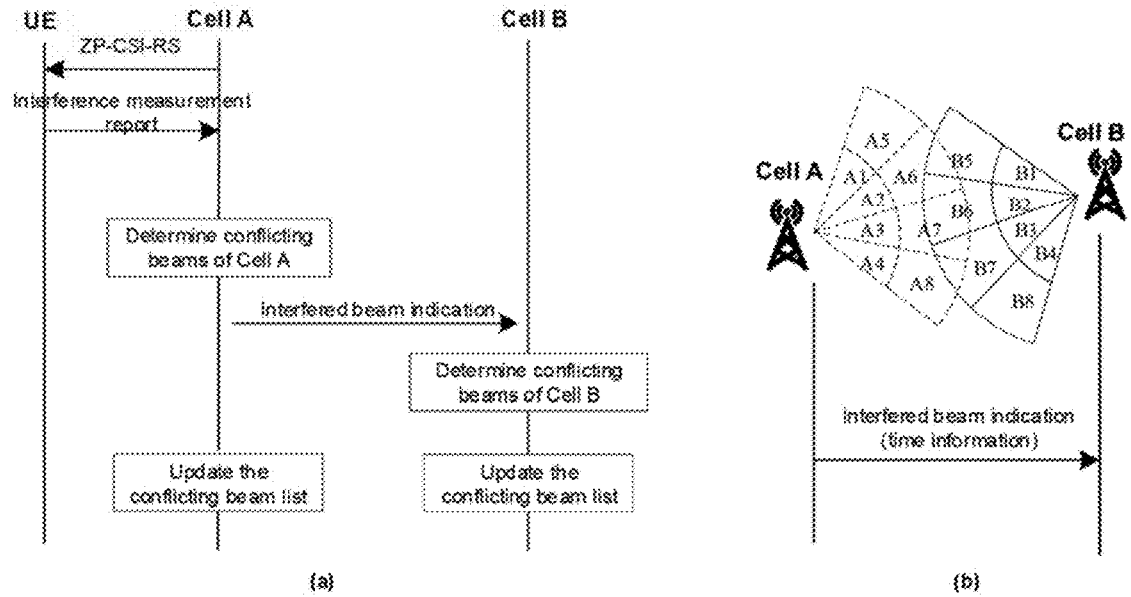
FIGS. 9A and 9B are examples illustrating a flowchart of generating or updating conflicting beam lists according to the first embodiment.

FIG. 9A is an example illustrating a flowchart of generating or updating the conflicting beam list according to a first embodiment.

As shown in FIG. 9A, the base station of Cell A can receive an interference measurement report from its UE to determine the conflicting situations of the beams for downlink transmission to the UE. As an example, the base station may assign a zero-power reference signal such as a zero-power channel state information reference signal (ZP-CSI-RS) to the UE on a certain time-frequency resource block, which is equivalent to the base station not transmitting a signal to the UE, thereby the signal received by the UE can be seen as an interference signal. The UE can measure the signal strength or received power of the interference signal as the measurement result. Alternatively, the UE may compare the measurement result with a predetermined threshold, and when the measurement result exceeds a predetermined threshold, the UE chooses to feed back to the base station in a form of an interference measurement report that it has been measured the interference from the adjacent cell.

It should be understood that the interference measurements may also be performed in other manner. For example, depending on a device capability of the UE, the UE can determine upon reception that the signal from the local cell is superimposed with an interference from another cell, and send an interference measurement report to the base station to feed back the presence of the inter-cell interference, without the need for a base station to allocate ZP-CSI-RS.

The interference measurement report feedback by the UE includes at least time information when the inter-cell interference is measured. It is desired that such time information has as a small granularity as possible, and is as accurate as possible, for example to the extent of which time slot, even of which symbols in the time slot.

As shown in FIG. 9A, in response to receiving the interference measurement report from the UE, the base station of Cell A can know that the UE is interfered with an inter-cell interference in the period indicated by the time information contained in the interference measurement report. That is, the position of the UE is covered by a beam of the adjacent cell. Therefore, the base station can determine the beam for the downlink transmission to the UE as a conflicting beam, such as Beam A7 shown in part (b) of FIG. 9A, and updating the conflicting beam list of Cell A. If this beam is not recorded in the conflicting beam list, the base station can create a new entry in the conflicting beam list and store the beam index of the beam. If the beam has been recorded in the conflicting beam list, no action is taken.

On the other hand, the base station of Cell A can extract from the interference measurement report the time information when the interference is measured, and generate and send an interfered beam indication including the time information to the adjacent cell through an interface between the base stations (e.g., Xn interface). The base station of Cell B extracts the time information from the interfered beam indication to determine which beam was used within the period indicated by the time information. In connection with the example shown in FIG. 9A, if the base station of Cell B determines that Beam B6 was transmitted within the period, it can be assumed that Beam B6 generated the interference to the UE of Cell A. The base station of Cell B can determine that Beam B6 is a conflicting beam, and the conflicting beam list of Cell B can be updated accordingly. If this beam is not recorded in the conflicting beam list, the base station can create a new entry in the conflicting beam list and store the beam index (B6) of the beam. If the beam has been recorded in the conflicting beam list, no action is taken.

The case of one adjacent cell is discussed above, but in the actual scenarios, Cell A may also be adjacent to other cells in addition to Cell B. The base station of Cell A can transmit the same interfered beam indication to all adjacent cells through the interface between the base stations (e.g., the Xn interface). Based on the time information included in the received interfered beam indication, each of the adjacent cells can determine the beam transmitted during the time period. However, not all of the beams determined by the adjacent cells have interfered the UE of Cell A. In order to further determine which of the adjacent cells interfered with the UE of Cell A, the interfered beam indication transmitted by Cell A to the adjacent cells can also include other information, such as the location information, orientation information or the like of the UE to facilitate each of the adjacent cells to accurately determine the conflicting beam.

Figure 9B:
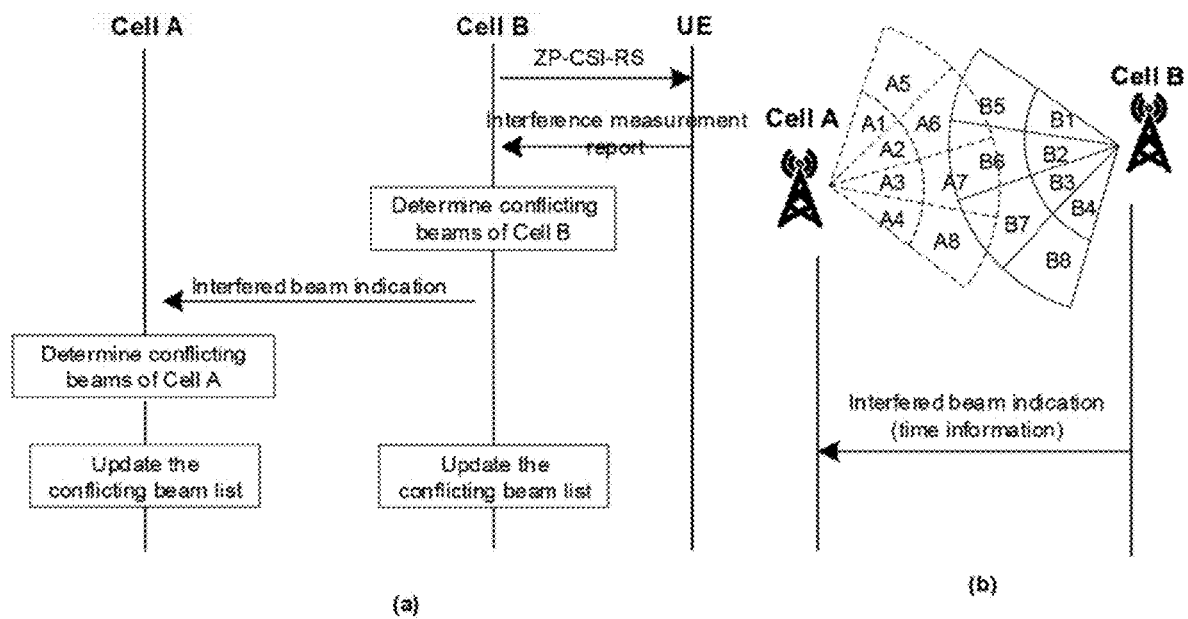

Similarly, Cell B can also implement the above process. As shown in FIG. 9B, the base station of Cell B can receive, from a UE served by Cell B, an interference measurement report that an inter-cell interference has been measured. On the one hand, the base station of Cell B can determine the beam used for downlink transmission to the UE, such as Beam B7 of Cell B in the example shown in FIG. 9B, is a conflicting beam, and accordingly update the conflicting beam list. On the other hand, the base station of Cell B can transmit an interfered beam indication to its adjacent cell such as a cell A, and the interfered beam indicates time information about when the interference is received by the UE, so that Cell A can determine that the beam transmitted in the time period indicated by the time information, such as Beam A8 of Cell A as illustrated in part (b) of FIG. 9B, is a conflicting beam. The base station of Cell A updates its conflicting beam list accordingly.

By repeating the above process, each of the base stations of Cell A and Cell B can constantly enrich its conflicting beam list, and finally is able to know all conflicting beams in its local cell and adjacent cells, so that the conflicting beam list can completely record all conflicting beams of the base station, to obtain a complete conflicting beam list as shown in FIG. 8. In general, in the case where the cell distribution is fixed, the coverage of each beam of each cell is also fixed, unless a significant change occurs in the surrounding environment. Therefore, the conflicting beam information recorded in the conflicting beam list is also valid for a long time, so the update frequency of the conflicting beam list will be very slow later, which means a resource overhead for the interference measurement by the UE to update the conflicting beam list, and an overhead for the notification between cells may be small.

The conflicting beam list maintained in the base station can be used to measure the beam scheduling for each UE (i.e., each beam) to achieve a beam-based cell interference coordination.

Specifically, a resource scheduler in the base station performs the resource scheduling process of the beams. The resource scheduler operates in the MAC sub-layer, considers not only how to allocate resources such as time-domain resources, frequency-domain resources, code-domain resources, power resources or the like to a single UE, but also the coordination and priority among multiple UEs. The coordination among the multiple UEs is implemented through a multi-user scheduling algorithm, which is not described in detail here.

For resource scheduling in downlink, the resource scheduler allocates, on a basis of a scheduling cycle, time-frequency resources within the scheduling cycle in advance. Specifically, the resource scheduler collects a downlink channel quality fed back by the UE to determine an appropriate modulation scheme and the highest rate, and determines how many physical resources are allocated based on the amount of data to be transmitted to the respective UE. The resource scheduling scheme can be sent to the corresponding UE, for example, via a physical downlink control channel (PDCCH), to inform the UE to receive the downlink data in what time-frequency resource block, and with what modulation coding scheme. Subsequently, the base station transmits the downlink data to the UE, for example, via a physical downlink shared channel (PDSCH) in a certain future period corresponding to the scheduling cycle, and the UE listens to the PDSCH according to the received resource scheduling scheme, so as to achieve reception of the data.

Figure 10:
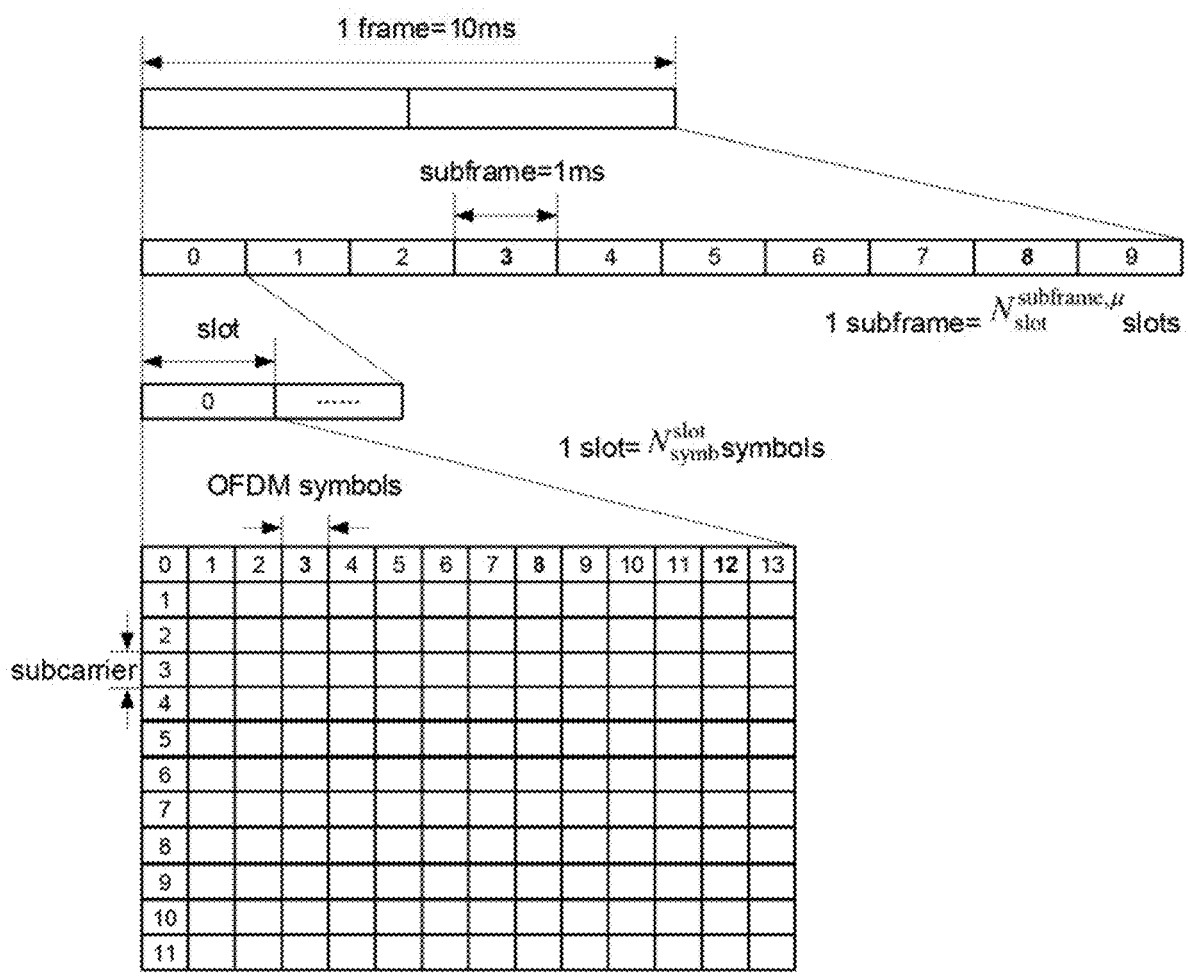
FIG. 10 illustrates a diagram of a frame structure in the NR communication system.

The scheduling cycle may be a time unit of different granularity. As specified in the first standard R15 of the 5G NR, the uplink transmission and downlink transmission of NR are organized into frames. FIG. 10 illustrates a diagram of a frame structure in the NR communication system. As shown in FIG. 10, each frame has a length of 10 ms, and is divided into two half frames of equal size, and is further divided into 10 subframes of equal sizes, each subframe being 1 ms. Different from the LTE communication system, the frame structure in the NR communication system has a flexible architecture based on subcarrier spacing. Time slots of each subframe may be configurable, and may include $N_{slot}^{subframe,\mu}$ consecutive time slots, while the number of symbols in each time slot may also be configurable, and may include $N_{symb}^{slot}$ OFDM symbol, so that the number of consecutive symbols per subframe is $N_{slot}^{subframe,\mu}=N_{symb}^{slot}N_{slot}^{subframe,\mu}$.

Table 1 below shows the number of symbols per time slot, the number of time slots per subframe and the number of symbols each subframe for the different subcarrier spacing μ. (the value of μ may be 0, 1, 2, 3, 4) in the case of conventional cyclic prefix, and Table 2 shows the number of symbols per time slot, the number of time slots per subframe and the number of symbols each subframe for the different subcarrier spacing μ. (the value of μ may be 2) in the case of extended cyclic prefix. Each time slot includes several resource blocks (RBs). The time slot can be represented by a grid of resource elements (REs). In one example, the resource block of each time slot can include 12 consecutive subcarriers in the frequency domain, and 14 consecutive OFDM symbols in the time domain for the conventional cycle prefix, that is, each time slot can be assigned with 12×14=168 resource elements.

TABLE 1 the number of symbols per time slot, the number of time slots per subframe and the number of symbols per subframe for the conventional cyclic prefix

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |

TABLE 1-continued the number of symbols per time slot, the number of time slots per subframe and the number of symbols per subframe for the conventional cyclic prefix

| $\mu$ | $N_{symb}^{slot}$ | $N_{slot}^{frame,\mu}$ | $N_{slot}^{subframe,\mu}$ |
|---|---|---|---|
| 3 | 14 | 80 | 8 |
| 4 | 14 | 160 | 16 |

TABLE 2 the number of symbols per time slot, the number of time slots per subframe and the number of symbols per subframe for the extended cyclic prefix

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

The NR communication system currently supports scheduling on basis of one time slot, and allocates the OFDM symbols within a time slot in a consecutive manner to each respective UE for use. However, it should be understood that depending on the specific resource scheduling algorithm used by the communication system, the scheduling cycle may also be a subframe, a half frame, or even a frame, etc.

Figure 11:
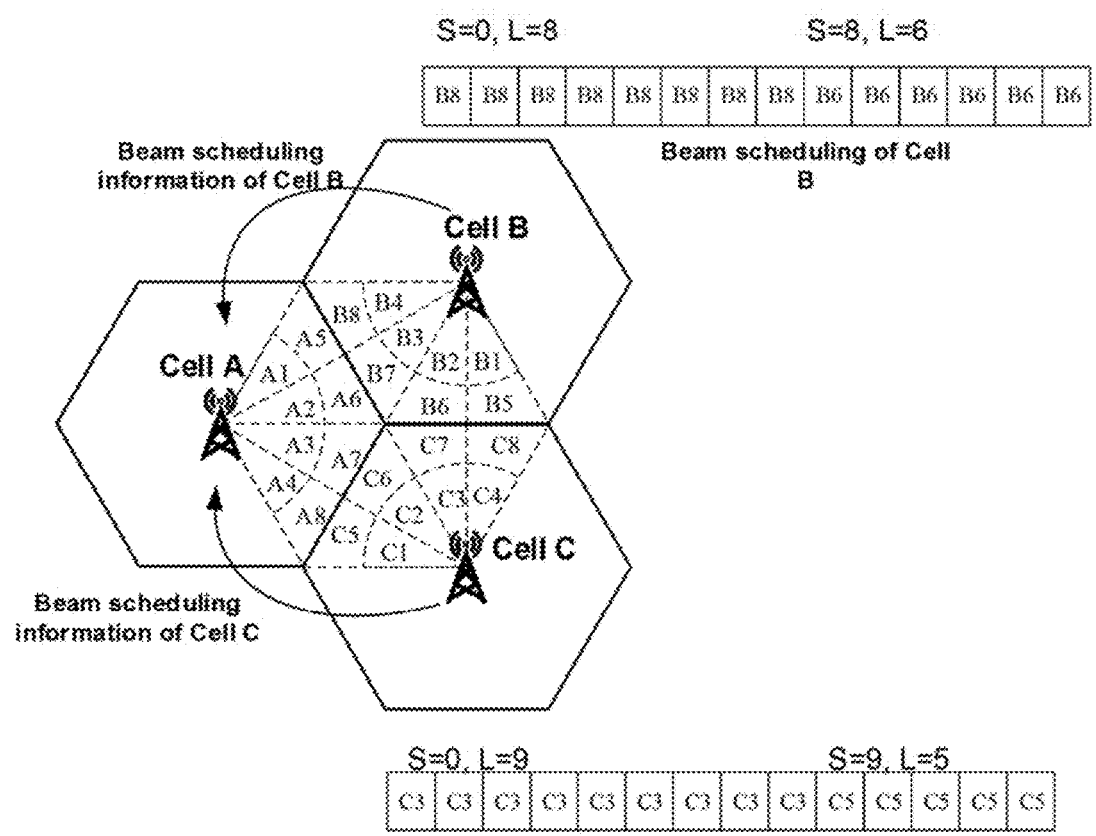
FIG. 11 illustrates a cell model including three adjacent cells.

The embodiment according to the present disclosure will be described in detail below with reference to the cell model illustrated in FIG. 11. Three adjacent cells are illustrated in FIG. 11, and a simplified diagram of partial beams of each cell and their coverages are shown. It should be understood that the beam conflicts shown in FIG. 11 are merely illustrative.

Figure 12:
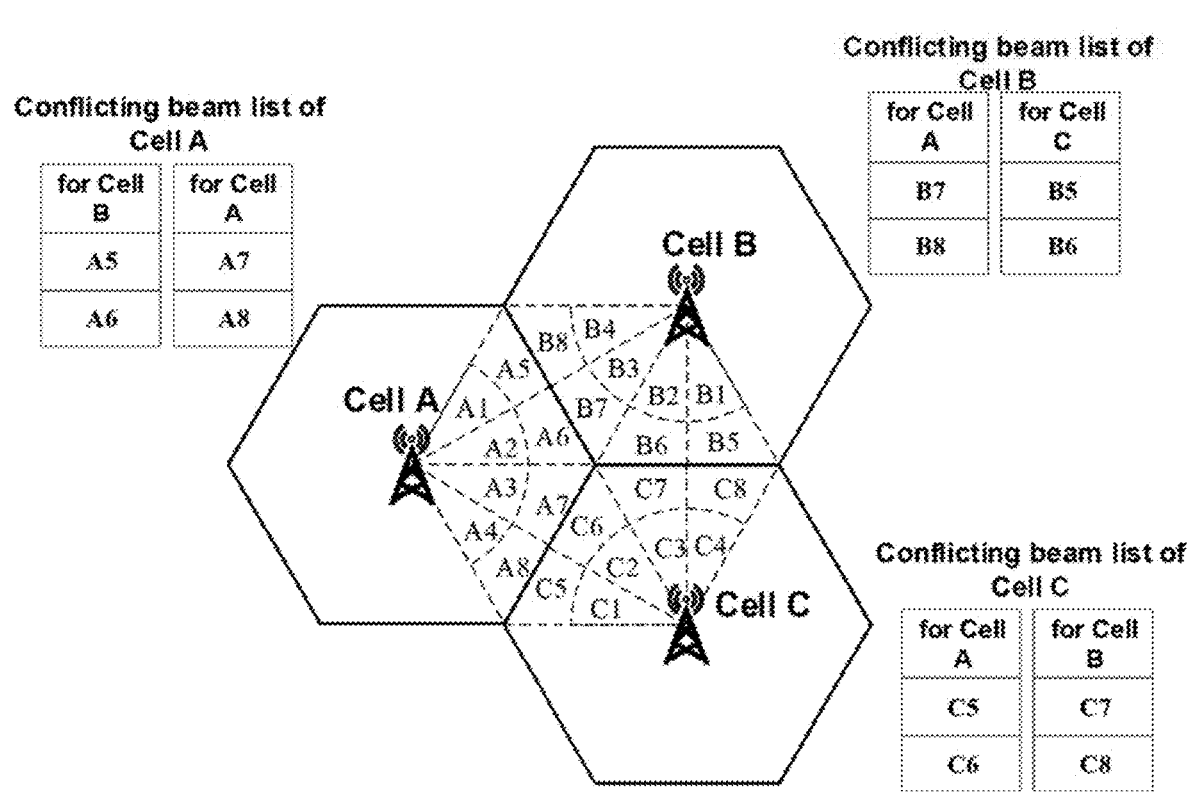
FIG. 12 illustrates a conflicting beam list according to the first embodiment.

FIG. 12 illustrates the conflicting beam lists of the respective cells illustrated in FIG. 11. For example, for Cell A, Beam A5 conflicts with Beam B8 of Cell B, and Beam A6 conflicts with Beam B7 of Cell B, so Cell A maintains a conflicting beam list for Cell B, which indicates the conflicting beams A5 and A6 of Cell A. In addition, Beam A7 of Cell A conflicts with Beam C6 of Cell C, and Beam A8 conflicts with Beam C5 of Cell C, so Cell A also maintains the conflicting beam list for Cell C, which indicates the conflicting beams A7 and A8 of Cell A. Similarly, Cell B can maintain a conflicting beam list for Cell A, which indicates the conflicting beams B7 and B8 of Cell B, and a conflicting beam list for Cell C, which indicates the conflicting beams B5 and B6 of Cell B. Cell C can maintain a conflicting beam list for Cell A, which indicates the conflicting beams C5 and C6, and a conflicting beam list for Cell B, which indicates the conflicting beams C7 and C8 of Cell C.

Back to FIG. 11, assuming that Cell B adjacent to Cell A has determined its beam scheduling in a certain scheduling cycle. In this example, the scheduling cycle is a time slot, and the resource scheduler of the base station can schedule OFDM symbol resources and subcarrier resources in the time slot. For example, as shown in FIG. 11, the resource scheduler of Cell B allocates a set of time-domain resources, 14 OFDM symbols, to UEs to be served in this time slot, for example, such as one UE (represented by Beam B8) is allocated with the first 8 consecutive symbols in this time slot, which may be represented by (S=0, L=8), where S represents the starting symbol index, L represents the number of allocated consecutive symbols, another UE (represented by Beam B6) is allocated with subsequent six consecutive OFDM symbols in the time slot, which may be represented by (S=8, L=6).

By means of the signaling flow described in FIG. 6, Cell B determines (e.g., by the conflicting beam determining unit 102 of the base station device 100) that the transmitting beam B8 is included in the beams to be used for downlink transmission within the above-mentioned time slot by looking up its conflicting beam list for Cell A, and thus sends (e.g., by the beam scheduling information sending unit 103 of the base station device 100) beam scheduling information for the time slot to Cell A.

Similarly, assuming that Cell C adjacent to Cell A has also determined its beam scheduling in the same scheduling cycle in advance. For example, as shown in FIG. 11, the resource scheduler of Cell C allocates to one UE (represented by Beam C3) to be served in the time slot the first 9 consecutive OFDM symbols in the time slot, which may be represented as (S=0, L=9), and allocates to another UE (represented by Beam C5) subsequent 5 consecutive OFDM symbols in the time slot, which may be represented as (S=9, L=5).

Cell C determines (e.g., by the conflicting beam determining unit 102 of the base station device 100) that the conflicting beam C5 is included in the beams to used for downlink transmission within the above-mentioned time slot by looking up its conflicting beam list for Cell A, and thus sends (e.g., by the beam scheduling information sending unit 103 of the base station device 100) beam scheduling information for the time slot to Cell A.

Figure 13:
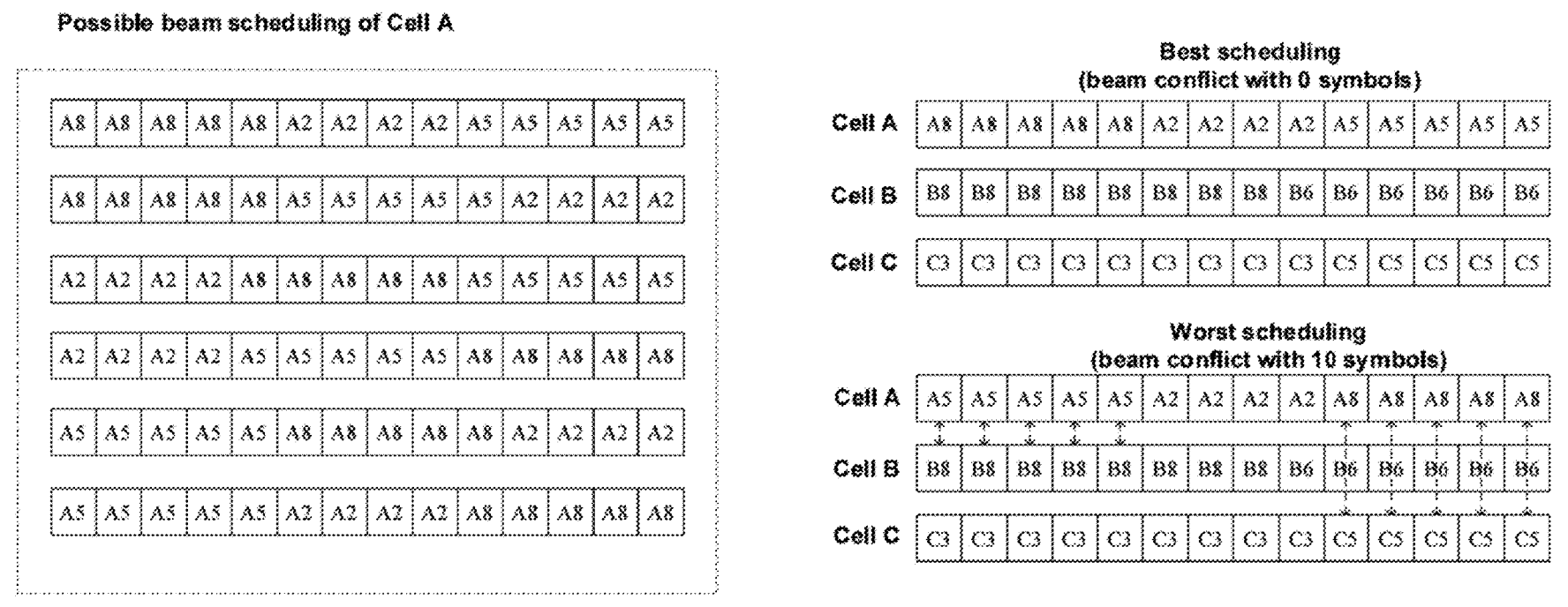

Assuming that Cell A has decided Beams A2, A5 and A8 to be scheduled in the above-mentioned time slot, and the number of OFDM symbols to be allocated to each beam. For example, depending on the amount of data to be transmitted to the UE, it is required to allocate 4 symbols to Beam A2, 5 symbols to Beam A5, and 5 symbols to Beam A8. At this time, there are six beam scheduling schemes that may be employed by Cell A, as shown on the left side of FIG. 13. However, based on the conflicting beam list of Cell A, Cell A determines (e.g., by the conflicting beam determining unit 203 of the base station device 200) that Beam A5 conflicting with the beam of Cell B and Beam A 8 conflicting with the beam of Cell C are included in the beams to be scheduled, and different beam scheduling schemes can cause different levels of inter-cell interference. The right side of FIG. 13 shows the best scheduling versus the worst scheduling for Cell A. In the best scheduling, Cell A completely avoids the beam conflict with Cell B and Cell C, and no inter-cell interference is caused. In worst scheduling, Beam A5 of Cell A has a beam conflict with Beam B8 of Cell B in 5 symbols, and Beam A8 of Cell A also has a beam conflict with Beam C5 of Cell C in 5 symbols, so that the UE in Cell A may be subjected to interference from adjacent cells within 71% of this time slot.

In order to achieve the best scheduling effect, Cell A can receive (e.g., by the beam scheduling information receiving unit 202) beam scheduling information from Cell B and Cell C, and schedules (e.g., by the resource allocating unit 204) the beams based on the received beam scheduling information.

The beam scheduling information from Cell B and Cell C indicates at least resource allocation information of the conflicting beams to be scheduled by respective cells.

In one example, the beam scheduling information is specifically indicative of complete scheduling information of the resource allocation of each conflicting beam.

Taking cell B as an example, Cell B may generate beam scheduling information to indicate which symbols are allocated to its conflicting beam. For example, Cell B can generate beam scheduling information [1, 1, 1, 1, 1, 1, 1, 1, 0, 0, 0, 0, 0] in a form of bitmap, where "1" denotes a conflicting beam, and "0" denotes a non-conflicting beam, because Cell A cannot distinguish the specific beams of Cell B. Cell B can also utilize a tuple (S, L) to represent the resources allocated to each conflicting beam, where S represents the starting symbol position, and L represents the number of consecutive symbols, so that the beam scheduling information of Cell B can be represented as (S=0, L=8). The beam scheduling information can be in any other form, as long as it can indicate the resource allocation of at least the conflicting beam. The beam scheduling information can also be encoded to reduce the signaling transmission load.

Figure 14:
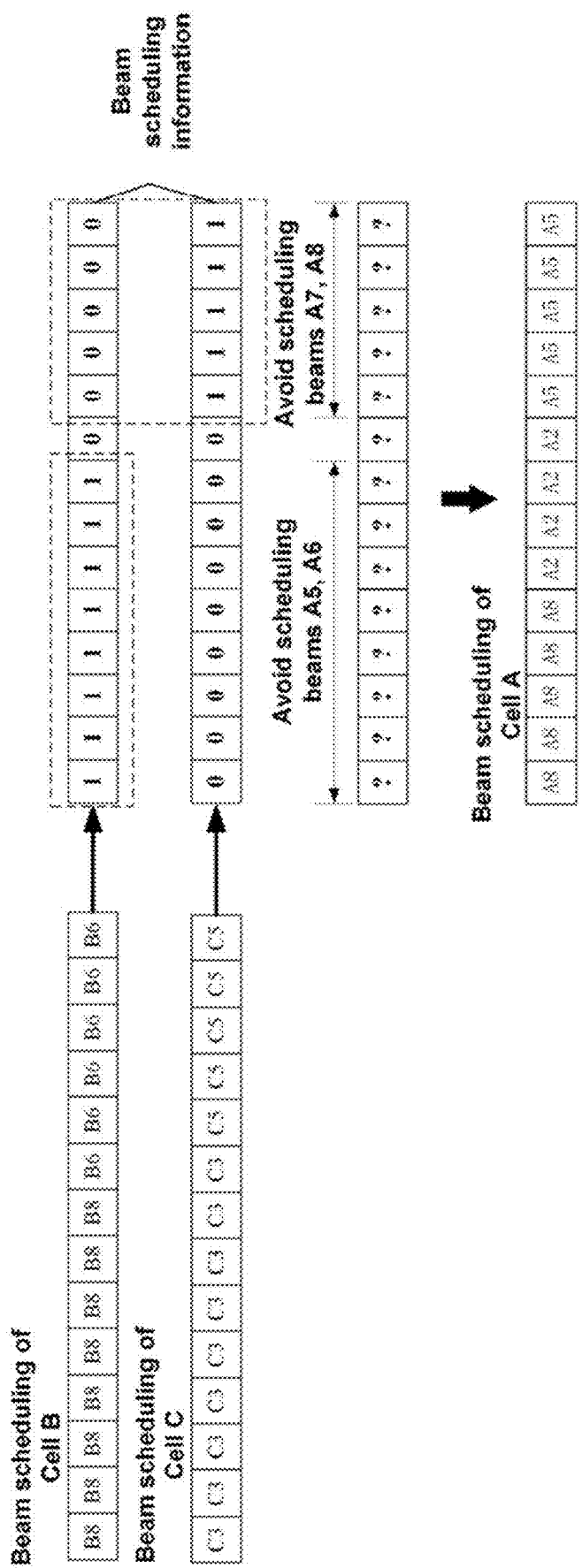
FIG. 14 illustrates a beam scheduling based on complete scheduling information according to the first embodiment.

Similarly, Cell A receives the beam scheduling information from Cell B and the beam scheduling information from Cell C, and extracts the resource allocation information of the conflicting beams of Cell B and Cell C. As shown in FIG. 14, based on the beam scheduling information of Cell B, Cell A knows that Cell B has allocated the front 8 symbols within the time slot to the conflicting beams, so it is desirable to avoid the allocation of the first 8 symbols to the conflicting beams A5 and A6 associated with Cell B. Further, based on the beam scheduling information of Cell C, Cell A knows that Cell C has allocated the rear 5 symbols within the time slot to the conflicting beams, so it is desirable to avoid the allocation of the rear 5 symbols to the conflicting beams A7, A8 associated with Cell C. As a result, Cell A can select a beam scheduling scheme having a minimum beam conflict from its possible beam scheduling scheme, such as the best scheduling scheme shown in FIG. 13.

In another example, the beam scheduling information is a front-end/rear-end information indicating a general resource allocation of each of the conflicting beams to indicate that the conflicting beam is allocated at the front end or the rear end of a set of resources.

Also taking Cell B as an example, Cell B can generate beam scheduling information to indicate that the resources for its conflicting beam is allocated to the front end of a set of OFDM symbols. Such beam scheduling information indicating the front end or the rear may be in a form of bitmap, for example, (1, 0) indicates the resource of the conflicting beam is close to the front end, (0, 1) indicates the resource of the conflicting beam is close to the rear end, and (1, 1) Indicates that the front end and the rear end are allocated with resources of conflicting beams. Cell B allocates symbols close to the front end of the time slot to the conflicting beam B8, and thus sends the beam scheduling information containing front-end information to Cell A. Similarly, Cell C allocates symbols close to the rear end of the time slot to the conflicting beam C5, and thus sends the beam scheduling information containing rear-end information to Cell A.

Figure 15:
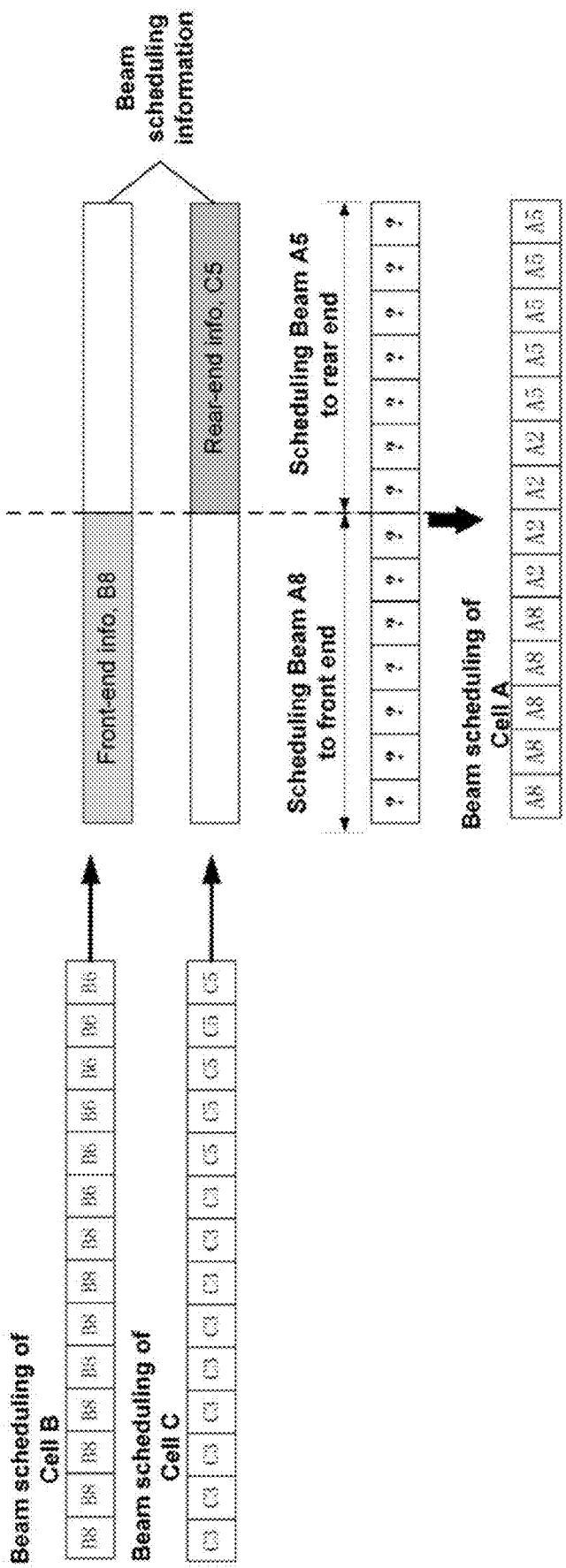
FIG. 15 illustrates beam scheduling based on front/rear information based on the first embodiment.

Cell A receives the beam scheduling information from Cell B and the beam scheduling information from Cell C, and extracts the resource allocation information of the conflicting beams of Cell B and Cell C. As shown in FIG. 15, based on the beam scheduling information of Cell B, Cell A knows that Cell B has allocated the resource of the conflicting beam at the front end of the time slot, and therefore it is preferable to allocate the resources for the conflicting beams A5, A6 associated with Cell B at the rear end of the time slot. Further, based on the beam scheduling information of Cell C, Cell A knows that Cell C has allocated the resource of the conflicting beam at the rear end of the slot, and therefore it is preferable to allocate the resource for the conflicting beams A7, A8 associated with Cell C at the front end of the time slot. As a result, Cell A can select a beam scheduling scheme having a minimum beam conflict from its possible beam scheduling schemes, such as the best scheduling scheme shown in FIG. 13.

In order to reduce the signaling transmission load between the base stations, the arrangement about the conflicting beam being allocated at the front end or the rear end at a set of resources (e.g., time-domain resources such as OFDM symbols, or frequency-domain resources such as subcarriers) may be semi-persistent for two cells. Specifically, if Cell A allocates the resources for its conflicting beams at a different end from the resources for the conflicting beams of the adjacent cell as shown in FIG. 15, Cell A can send an acknowledgement message to the adjacent cell, to inform the adjacent cell that Cell has allocated its beams (e.g., Beams A5, A6) conflicting with the beams of Cell B at the rear end of the set of resources, and it tends to follow this schedule in future beam scheduling. In response to receiving this acknowledgement message, Cell B tends to allocate its beams (e.g., Beam B8) conflicting with Cell A at the front end of the set of resources in future beam scheduling. Similarly, between Cell A and Cell C, Cell A may tend to allocate its beams (e.g., Beams A7, A8) conflicting with the beams of Cell C at the front end of the set of resources in future beam scheduling, and Cell C may tend to allocate its beams (e.g., Beam C5) conflicting with the beams of Cell A at the rear end of the set of resources in future beam scheduling. FIG. 16 illustrates an example of the scheduling tendency of the conflicting beams recorded in each of the cells to facilitate the subsequent conflict-free scheduling of the conflicting beams, in which the table in FIG. 16 exemplifies merely the scheduling tendency obtained according to the example described in FIG. 15, but in the actual situation, the cells may gradually enrich such information on scheduling tendency. In this way, the transmission of beam scheduling information between Cell A and Cell B can be reduced.

Compared to sending complete scheduling information, the beam scheduling coordination based on the front-end/rear-end information is rougher, but the required information exchange is greatly reduced, and the information exchange can be valid for a long time, so it is not require to send the beam scheduling information per scheduling cycle.

Although the inter-cell beam scheduling coordination is described above in the time dimension by taking a set of time-domain resources (OFDM symbols) in the scheduling cycle as an example, it is understood that the embodiments of the present disclosure include performing the inter-cell beam scheduling coordination in the frequency dimension. For example, the beam scheduling performed by the base station of a cell can include the scheduling for a set of frequency-domain resources (e.g., a set of consecutive subcarriers), and the beam scheduling information may indicate the complete scheduling information or the front end/rear end of information for the frequency-domain resources allocated to the conflicting beams, such that the cell that receives the beam scheduling information can avoid the beams conflicting with each other in the frequency dimension.

When the inter-cell beam scheduling coordination is performed in the time dimension, multiple beams within a single cell can be transmitted at the same frequencies but at different times, and the base station transmits only one beam at each time, and the inter-cell beam scheduling coordination is performed in the frequency dimension. When the inter-cell beam scheduling coordination is performed in the frequency dimension, multiple beams within a single cell can be transmitted at the same time but at different frequen-

Second Embodiment

In the first embodiment of the present disclosure, the scenario that each cell does not distinguish the beams of its adjacent cells is described. In the second embodiment of the present disclosure, the scenario that each cell can distinguish the beams of its adjacent cells is to be described mainly.

According to the second embodiment of the present disclosure, the conflicting beam list maintained in each base station indicates, in addition to a set of conflicting beams of the local cell involved in the cell inter-cell interference between the local cell and the adjacent cell, a set of conflicting beams of the adjacent cell involved in the inter-cell interference between the local cell and the adjacent cell, wherein the set of conflicting beams of the local cell and the set of conflicting beams of the adjacent cell are associated with each other, that is, conflicting with each other.

Figure 17:
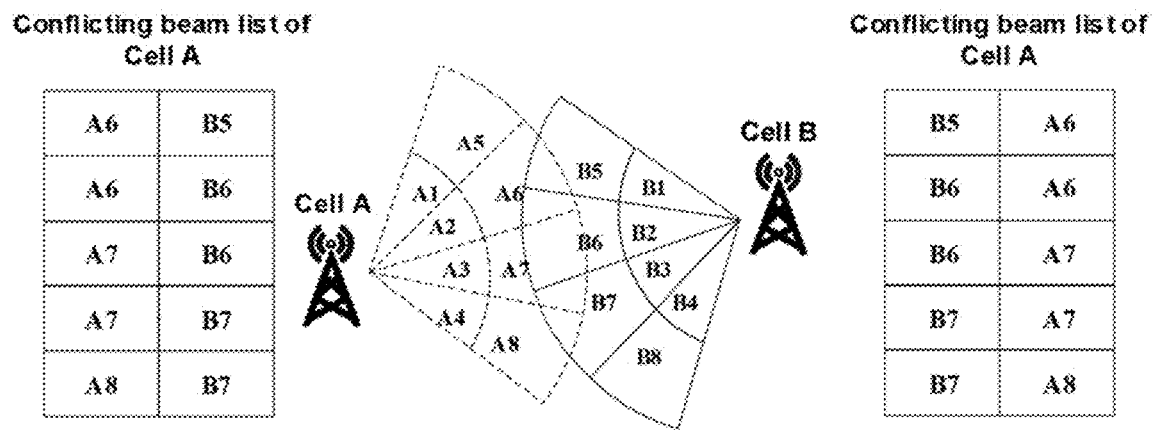
FIG. 17 illustrates an example of a conflicting beam list according to a second embodiment.

FIG. 17 illustrates an example of a conflicting beam list according to the second embodiment. Unlike the conflicting beam list shown in FIG. 8, the conflicting beam list shown in FIG. 17 stores the mutually conflicting beams of cell A and Cell B in pairs.

For example, Beam A6 of Cell A is overlapped with Beam B5 of Cell B in terms of coverage, and the user of Cell A or Cell B may be subjected to interference from the adjacent cell when in the overlapped coverage area. Therefore, Beam A6 of Cell A and Beam B5 of Cell B are conflicting beams of their cells, respectively, and the beam indexes of the two beams are both stored in the conflicting beam lists of Cell A and Cell B.

As an example, the beam index may be an identifier of a reference signal corresponding to the beam, for example, an identifier (SSBRI) of SSB resource or an identifier (CRI) of CSI-RS resource. Alternatively, the beam index may be the number of each beam in the beam set inside the base station. Various indexing manners are feasible, as long as the base station can identify the corresponding beam through the beam index. In the present disclosure, the beam index may use simple numbers A1 to A8, but it should be understood that the beam indexing manner is not limited thereto.

In the example shown in FIG. 17, Beams A6 to A8 of Cell A are conflicting beams, while Beam A5 is not overlapped with any beam of Cell B in terms of coverage, so it is not a conflicting beam. Similarly, both Beams B5 to B7 of Cell B are conflicting beams, and Beam B8 is not a conflicting beam. By storing the conflicting beams in pairs, Cell A and Cell B can maintain an identical conflicting beam list, which clearly reflect the specific beam conflicts of Cell A and Cell B.

Figure 18A:
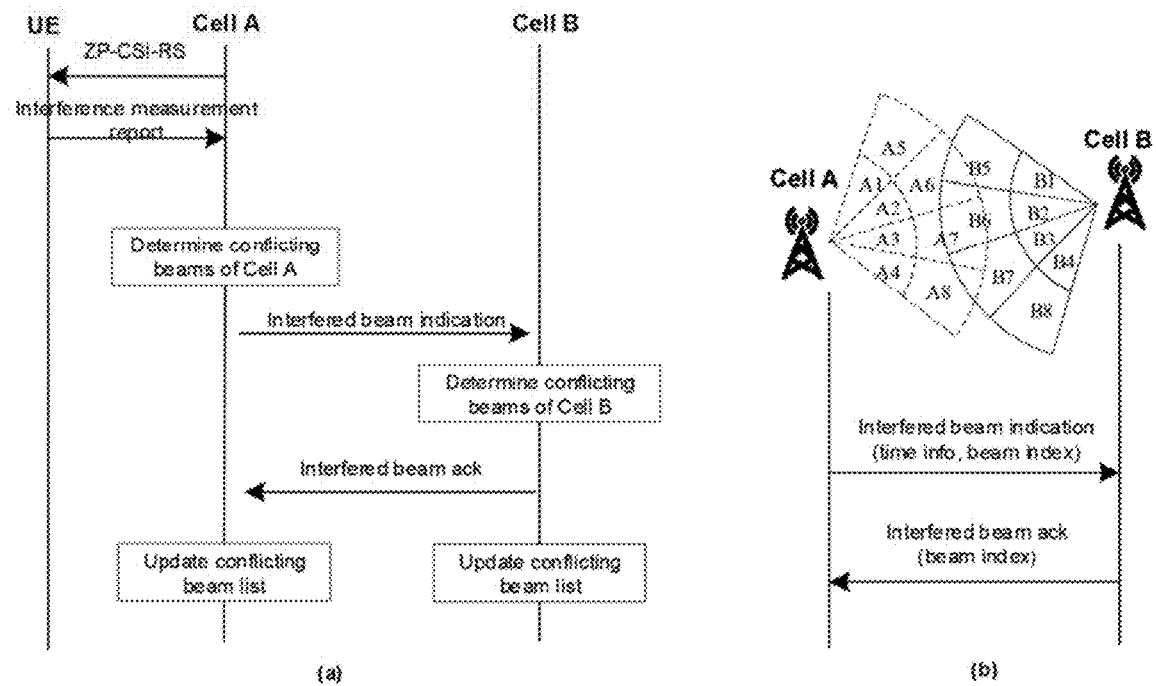
FIGS. 18A and 18B are examples illustrating flowcharts of generating or updating the conflicting beam list according to the second embodiment.

FIG. 18A is an example illustrating a flowchart of generating or updating the conflicting beam list according to the second embodiment.

As shown in FIG. 18A, the base station of Cell A can receive an interference measurement report from its UE to determine the conflict of beams for downlink transmission to the UE. As an example, the base station can assign a zero-power reference signal such as a zero-power channel state information reference signal (ZP-CSI-RS) to the UE on a certain time-frequency resource block, which is equivalent to the base station transmitting no signal to the UE, thereby the signal received by the UE can be seen as an interference signal. The UE can measure the signal strength or received power of the interference signal as the measurement result. Alternatively, the UE may compare the measurement result with a predetermined threshold, and when the measurement result exceeds the predetermined threshold, the UE chooses to feed back to the base station in a form of an interference measurement report that it has measured the interference from the adjacent cell. Of course, the interference measurement may also be performed in other manners.

The interference measurement report fed back by the UE includes at least time information about when the inter-cell interference is measure. It is desired that such time information has as a small granularity as possible, and is as accurate as possible, for example to the extent of which time slot, even of which symbols in the time slot.

As shown in FIG. 18A, in response to receiving the interference measurement report from the UE, the base station of Cell A can know that the UE was subjected to an inter-cell interference in the period indicated by the time information contained in the interference measurement report. That is, the position of the UE is covered by a beam of the adjacent cell. Therefore, the base station can determine the beam for the downlink transmission to the UE as a conflicting beam, such as Beam A7 shown in part (b) of FIG. 18A, and updating the conflicting beam list of Cell A. If this beam is not recorded in the conflicting beam list, the base station can create a new entry in the conflicting beam list and store the beam index of the beam. If the beam has been recorded in the conflicting beam list, no action is taken.

On the other hand, the base station of Cell A can extract from the interference measurement report the time information about when the interference was measured, and generate and send an interfered beam indication including the time information to the adjacent cell through an interface between the base stations (e.g., Xn interface). Unlike the first embodiment, according to the second embodiment, the interfered beam indication further includes a beam index of the conflicting beam determined by Cell A, such as Beam A7. The base station of Cell B extracts the time information from the interfered beam indication to determine which beam was used within the period indicated by the time information. In connection with the example shown in part (b) of FIG. 18A, if the base station of Cell B determines that Beam B6 was transmitted within the period, it can be assumed that Beam B6 generated the interference to Beam A7 of Cell A. The base station of Cell B can determine that Beam B6 is a conflicting beam, and the conflicting beam list of Cell B can be updated accordingly. If this beam is not recorded in the conflicting beam list, the base station can create a new entry in the conflicting beam list and store the beam indexes of Beam B6 and Beam A7 in pair. If the beam has been recorded in the conflicting beam list, no action is taken. In addition, Cell B can send an interfered beam acknowledgement to Cell A, the interfered beam acknowledge contains the beam index of the conflicting beam confirmed by Cell B (for example, B6), so that Cell A can update its own conflicting beam conflict list and store the beam indexes of Beam B6 and Beam A7 in pair.

Figure 18B:
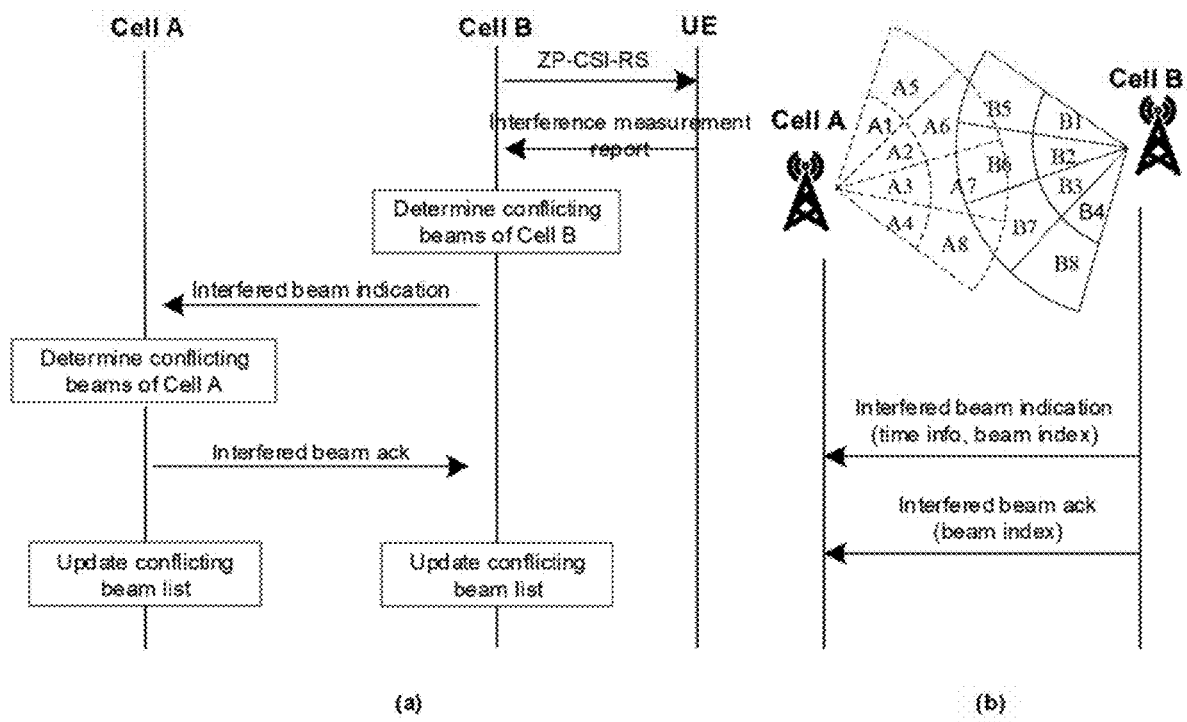

Similarly, Cell B can also implement the above process. As shown in FIG. 18B, the base station of Cell B can receive, from a UE served by Cell B, an interference measurement report that an inter-cell interference has been measured. On the one hand, the base station of Cell B can determine the beam used for downlink transmission to the UE, such as Beam B7 of Cell B in the example shown in part (b) of FIG. 18B, is a conflicting beam, and accordingly update the conflicting beam list. On the other hand, the base station of Cell B can send an interfered beam indication to its adjacent cell such as a Cell A, and the interfered beam indicates time information about when the interference was received by the UE as well as the beam index of the interfered beam, so that Cell A can determine that the beam transmitted in the period indicated by the time information, such as Beam A8 of Cell A as illustrated in part (b) of FIG. 18B, is a conflicting beam. The base station of Cell A updates its conflicting beam list accordingly. Cell A may store the determined conflicting beam A8 and the conflicting beam B7 of Cell B included in the interfered beam indication in pair in its conflicting beam list. In addition, Cell A can send an interfered beam acknowledgement to Cell B, and the interfered beam acknowledgement contains the beam index of the conflicting beam confirmed by Cell A (for example, A8), so that Cell B can update its own conflicting beam conflict list and store the beam indexes of Beam A8 and Beam B7 in pair.

By repeating the above process, each of the base stations of Cell A and Cell B can constantly enrich its conflicting beam list, and finally is able to know all conflicting beams in its local cell and adjacent cells, so that the conflicting beam list can completely record all conflicting beams of the base station, to obtain a complete conflicting beam list as shown in FIG. 17. In general, in the case where the cell distribution is fixed, the coverage of each beam of each cell is also fixed, unless a significant change occurs in the surrounding environment. Therefore, the conflicting beam information recorded in the conflicting beam list is also valid for a long time, so the update frequency of the conflicting beam list will be very slow later, which means a resource overhead for the interference measurement by the UE to update the conflicting beam list, and an overhead for the notification between cells may be small.

The second embodiment according to the present disclosure will be described in detail below with reference to the cell model exemplified in FIG. 11.

Figure 19:
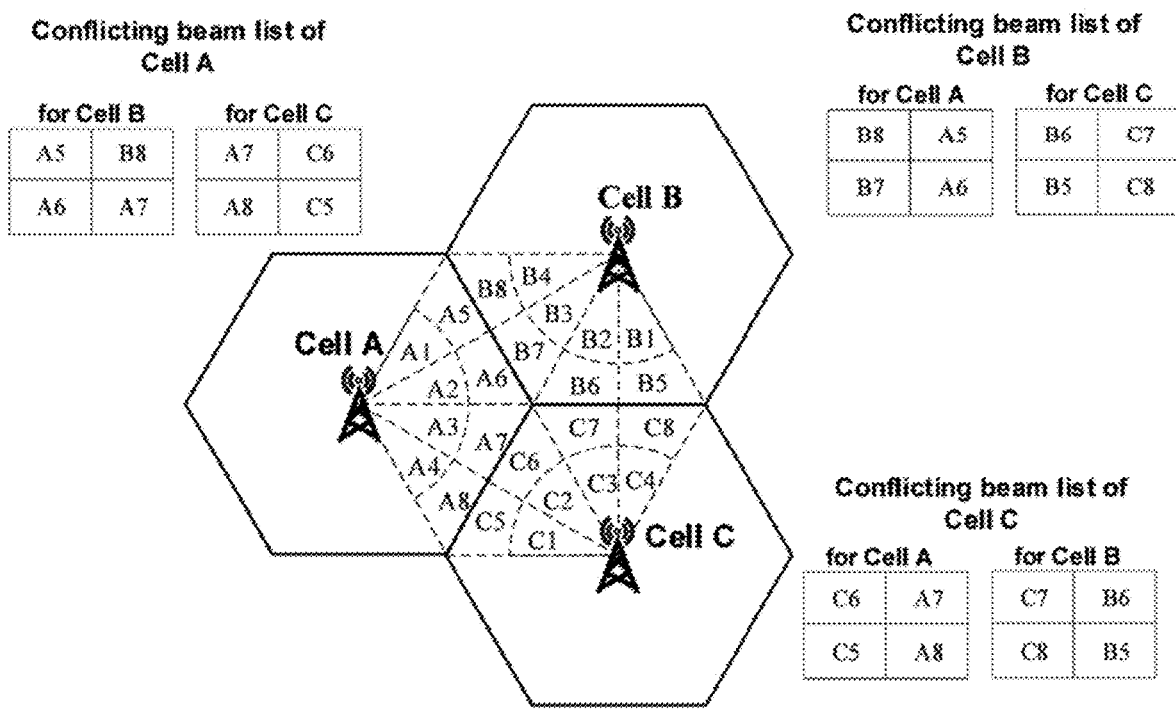
FIG. 19 illustrates a conflicting beam list according to the second embodiment.

FIG. 19 illustrates the conflicting beam lists of the respective cells illustrated in FIG. 11. For example, for Cell A, Beam A5 conflicts with Beam B8 of Cell B, and Beam A6 conflicts with Beam B7 of Cell B, so Cell A maintains the conflicting beam list for Cell B, which indicates the conflicts between Beam A5 of Cell A and Beam B8 of Cell B, and between Beam A6 of Cell A and Beam B7 of Cell B. Further, Beam A7 of Cell A conflicts with Beam C6 of Cell C, and Beam A8 conflicts with Beam C5 of Cell C, so Cell A also maintains a conflicting beam list for Cell C, which indicates the conflicts between Beam A7 of Cell A and Beam C6 of Cell C, and between Beam A8 of Cell A and Beam C5 of Cell C. Similarly, Cell B can maintain conflicting beam lists for Cell A and Cell C, and Cell C can maintain conflicting beam lists for Cell A and Cell B, as shown in FIG. 19.

Back to FIG. 11, assuming that Cell B and Cell C adjacent to Cell A have determined their beam scheduling in a certain scheduling cycle. In this example, the scheduling cycle is a time slot, and the resource scheduler of the base station can schedule OFDM symbol resources and subcarrier resources in the time slot.

By means of the signaling flow described in FIG. 6, Cell B determines (e.g., by the conflicting beam determining unit 102) that the transmitting beam B8 is included in the beams to be used for downlink transmission within the above-mentioned time slot by looking up its conflicting beam list for Cell A, and thus sends (e.g., by the beam scheduling information sending unit 103) beam scheduling information for the time slot to Cell A. Similarly, Cell C determines (e.g., by the conflicting beam determining unit 102) that the transmitting beam C5 is included in the beams to be used for downlink transmission within the above-mentioned time slot by looking up its conflicting beam list for Cell A, and thus sends (e.g., by the beam scheduling information sending unit 103) beam scheduling information for the time slot to Cell A.

Assuming that Cell A has decided Beams A2, A5 and A8 to be scheduled in the above-mentioned time slot, and the number of OFDM symbols to be allocated to each beam. For example, depending on the amount of data to be transmitted to the UE, it is required to allocate 4 symbols to Beam A2, 5 symbols to Beam A5, and 5 symbols to Beam A8. In order to achieve the best scheduling effect, Cell A can schedule the beams based on the beam scheduling information from Cell B and Cell C.

The beam scheduling information from Cell B and Cell C indicates at least the resource allocation information of the conflicting beam to be scheduled to be scheduled.

In one example, the beam scheduling information is complete scheduling information that specifically indicates the resource allocation of each conflicting beam.

Taking Cell B as an example, Cell B can generate beam scheduling information to indicate which symbols are allocated to its conflicting beams. For example, since Cell A can distinguish the specific beams of Cell B, the beam indexes of the conflicting beams of Cell B are also indicated in the beam scheduling information. For example, Cell B can generate beam scheduling information that indicates the resource allocation of the beams by occupancy of their beam indexes in the resource grid, as shown in the beam scheduling information in FIG. 20. In addition, Cell B can also use a triple (S, L, Index) to represent the resource allocation of each conflicting beam, where S represents the starting symbol position, and L represents the number of consecutive symbols, Index represents the index of the conflicting beam. The beam scheduling information of Cell B can be represented by (S=0, L=8, B8). The beam scheduling information can be in any other form, as long as it can indicate the resource allocation of at least the conflicting beams. The beam scheduling information can also be encoded to reduce signaling transmission load.

Figure 20:
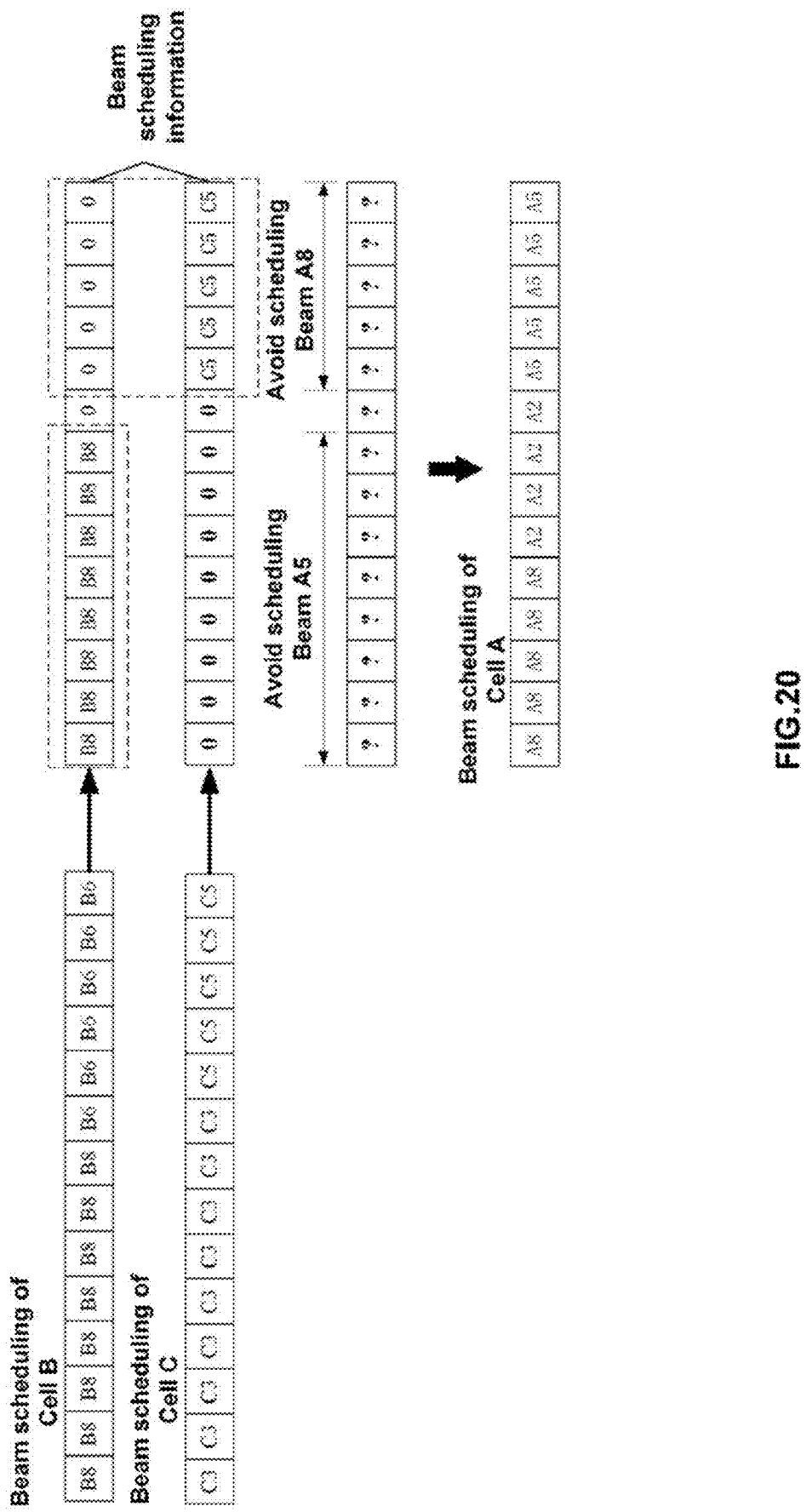
FIG. 20 illustrates beam scheduling based on complete scheduling information according to the second embodiment.

Cell A receives (e.g., by the beam scheduling information receiving unit 202) the beam scheduling information from Cell B and the beam scheduling information from Cell C, and extracts resource allocation information of the conflicting beams of Cell B and Cell C. As shown in FIG. 20, based on the beam scheduling information of Cell B, Cell A knows that Cell B has allocated the first 8 symbols in the time slot to the conflicting beam B8, and thus it is desired (for example, by the resource allocating unit 204) to avoid scheduling the front 8 symbols to Beam A5 conflicting with Beam B8 of Cell B. Further, based on the beam scheduling information of Cell C, Cell A knows that Cell C has allocated the rear 5 symbols within the time slot to the conflicting beam C5, so it is desired (for example, by the resource allocating unit 204) to avoid scheduling the rear 5 symbols to Beam A8 conflicting with Beam C5 of Cell C. As a result, Cell A can select a beam scheduling scheme having a minimum beam conflict from its possible beam scheduling schemes, such as the best scheduling scheme shown in FIG. 13.

In another example, the beam scheduling information indicates a general resource allocation of each of the conflicting beams, such as the conflicting beam is allocated at the front end or the rear end of a set of resources.

Also taking cell B as an example, Cell B can generate beam scheduling information to indicate that its conflicting beam B8 is allocated at the front end of a set of OFDM symbols, and thus sends the beam scheduling information containing front-end information to Cell A. In addition, the beam scheduling information also indicates the conflicting beam B8 of Cell B. Similarly, Cell C allocates symbols close to the rear end of the time slot to the conflicting beam C5, and thus sends the beam scheduling information containing rear-end information to Cell A. In addition, the beam scheduling information also indicates the conflicting beam C5 of Cell C.

Figure 21:
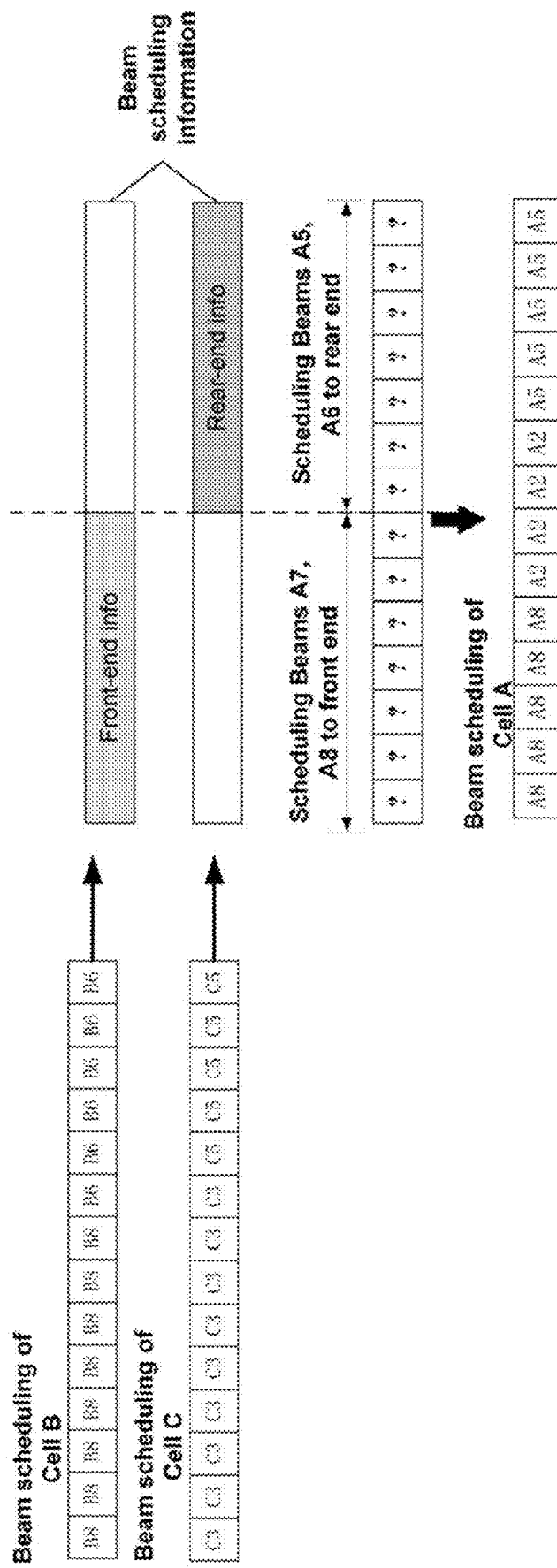
FIG. 21 illustrates beam scheduling based on front/rear information based on the second embodiment.

Cell A receives (e.g., by the beam scheduling information receiving unit 202) the beam scheduling information from Cell B and the beam scheduling information from Cell C, and extracts the resource allocation information of the conflicting beams of Cell B and Cell C. As shown in FIG. 21, based on the beam scheduling information of Cell B, Cell A knows that Cell B has allocated the resource of the conflicting beam B8 at the front end of the time slot, and thus it is desired (e.g., by the resource allocating unit 204) to allocate the resources for the conflicting Beam A5 conflicting with Beam B8 of Cell B at the rear end of the time slot. Further, based on the beam scheduling information of Cell C, Cell A knows that Cell C has allocated the resource of the conflicting beam C5 at the rear end of the time slot, and thus it is desired (e.g., by the resource allocating unit 204) to allocate the resource for the conflicting beam A8 conflicting with Beam C5 of Cell C at the front end of the time slot. As a result, Cell A can select a beam scheduling scheme having a minimum beam conflict from its possible beam scheduling schemes, such as the best scheduling scheme shown in FIG. 13.

Similar to the first embodiment, in order to reduce the signaling transmission load between the base stations, the arrangement about the conflicting beam being allocated at the front end or the rear end at a set of resources (e.g., time-domain resources such as OFDM symbols, or frequency-domain resources such as subcarriers) may be semi-persistent for two cells. Specifically, if as shown in FIG. 21, with the inter-cell interference coordination process according to the second embodiment, Cell A may send an acknowledgement message to Cell B, to inform that Cell A has allocated its beams (e.g., Beam A5) conflicting with the beams of Cell B at the rear end of the set of resources, and it tends to follow this schedule in future beam scheduling. In response to receiving this acknowledgement message, Cell B tends to allocate its beams (e.g., Beam B8) conflicting with the beam of Cell A at the front end of the set of resources in future beam scheduling. Similarly, between Cell A and Cell C, Cell A may tend to allocate its beams (e.g., Beam A8) conflicting with the beams of Cell C at the front end of the set of resources in future beam scheduling, and Cell C may tend to allocate its beams (e.g., Beam C5) conflicting with the beams of Cell A at the rear end of the set of resources in future beam scheduling. By recording the scheduling tendency for the conflicting beams, the transmission of beam scheduling information between Cell A and Cell B can be reduced.

Although the inter-cell beam scheduling coordination is described above in the time dimension by taking a set of time-domain resources (OFDM symbols) in the scheduling cycle as an example, it is understood that the embodiments of the present disclosure include performing the inter-cell beam scheduling coordination in the frequency dimension. For example, the beam scheduling performed by the base station of a cell can include the scheduling for a set of frequency-domain resources (e.g., a set of consecutive sub-carriers), and the beam scheduling information may indicate the complete scheduling information or the front end/rear end of information for the frequency-domain resources allocated to the conflicting beams, such that the cell that receives the beam scheduling information can avoid the beams conflicting with each other in the frequency dimension.

[Simulation Result]

The inventor has verified the effect of inter-cell interference coordination according to the present disclosure. The simulation is based on the three-cell scene illustrated in FIG. 11, and each cell uses beam in 4×2 or 8×2 different directions. Three UEs are provided in each cell at random, and each UE is served by a different beam. The scheduling cycle is 1 time slot, that is, 14 symbols, and the number of symbols occupied by the three UEs per cell is randomly generated, but the sum of symbols occupied by the three UEs is 14.

The simulation compares the performances of the random scheduling method (i.e., without ICI) and a total of four ICIC methods according to the present disclosure, including the case of not distinguishing the adjacent-cell beams (the first embodiment) and the case of distinguishing the adjacent-cell beams (the second embodiment). For ICICs based on the complete scheduling information in both cases, the simulation assumes that Cell B and Cell C send complete beam scheduling information to Cell A. For ICICs based on the front-end/rear-end information on beam scheduling, the simulation assumes that there are interactions of the front-end/rear-end information between Cell A and Cell B and between Cell A and Cell C.

Figure 22:
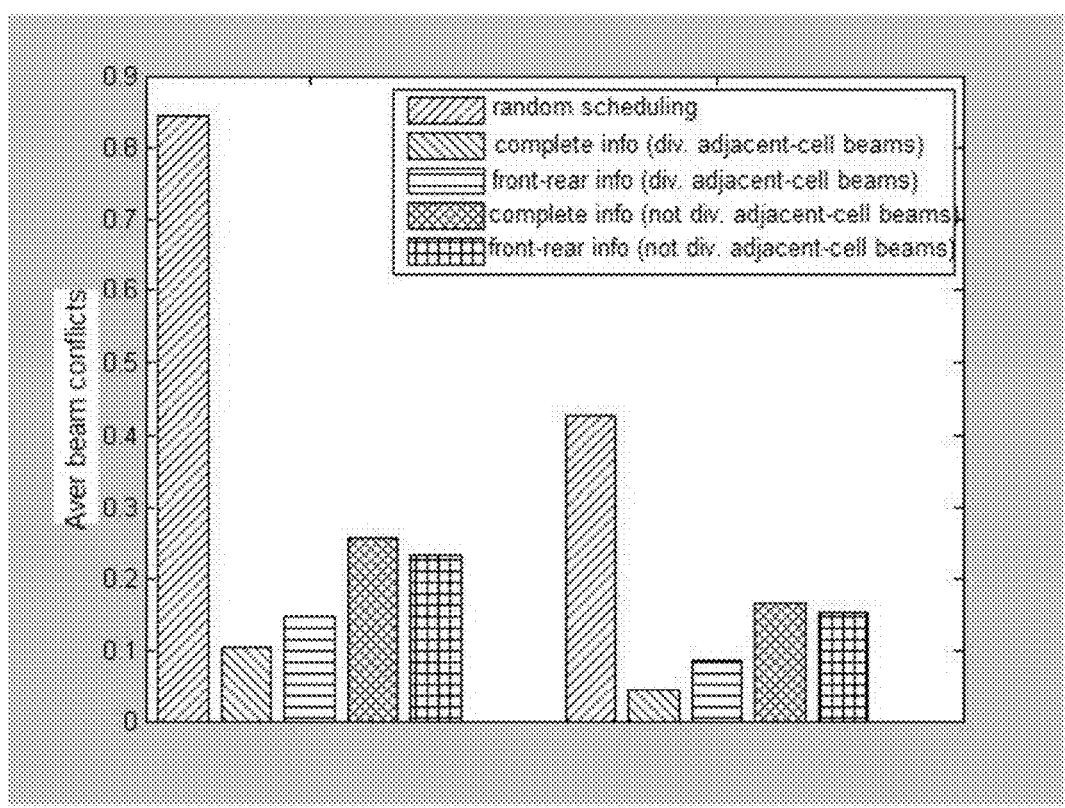
FIG. 22 is a diagram of simulation result.

After 10,000 randomly generated simulations, the number of average beam conflicts of Cell A with Cells B and C in each of the above methods are shown in FIG. 22. As can be seen from the plot, the random scheduling produces a significantly higher number of average beam conflicts than the four methods of the present disclosure, which means that the ICIC methods according to the present disclosure can significantly reduce beam conflicts, thereby avoiding the occurrence of inter-cell interference. In addition, the number of beam conflicts for the ICIC methods that distinguish the adjacent-cell beams is significantly lower than that for the ICIC methods that do not distinguish the adjacent-cell beams, because the ICIC distinguishing the adjacent-cell beam is rougher in avoiding the beam conflicts. At the same time, it can be seen that in the case of distinguishing the adjacent-cell beams, the number of beam conflicts based on the complete scheduling information is lower than the number of beam conflicts based on the front-end/rear-end information, because the complete scheduling information is finer than the front-end/rear-end information, and thus a lower number of beam conflicts can also be achieved, but the price is exchanging a significantly higher amount of inter-cell information than the case of the front-end/rear-end information on beam scheduling. However, in the case of not distinguishing the adjacent-cell beams, the performance of the ICIC based on the front-end/rear-end information is similar to, even slightly better than, that of the ICIC based on the complete scheduling information.

The various aspects of the embodiments of the present disclosure have been described above in detail, but it should be noted that, the structure, arrangement, type, number, etc. of the antenna array, ports, reference signals, communication devices, communication methods and the like are shown for purpose of description, but are not intended to limit the aspects of the present disclosure to these specific examples.

It should be understood that various units of the electronic devices 100 and 200 described in the above embodiments are only logical modules divided according to specific functions they implement, and are not limited to specific implementations. In actual implementation, the foregoing units may be implemented as independent physical entities, or may also be implemented by a single entity (for example, a processor (CPU or DSP, etc.), an integrated circuit, etc.).

Exemplary Implementations of the Present Disclosure

According to the embodiments of the present disclosure, various implementations for practicing concepts of the present disclosure can be conceived, including but not limited to:

1). A base station device, comprising: a processing circuitry configured to: based on a conflicting beam list, determine that at least one conflicting beam is included in a set of transmitting beams to be used for downlink transmission from a local cell in a future specific period; in response to the determining, send beam scheduling information for the future specific period to a base station of an adjacent cell, the beam scheduling information including at least information on time-frequency resources allocated to the at least one conflicting beam by the local cell.

2). The base station device of 1), wherein the conflicting beam list indicates a set of conflicting beams of the local cell involved in an inter-cell interference between the local cell and the adjacent cell.

3). The base station device of 2), wherein the conflicting beam list further indicates a set of conflicting beams of the adjacent cell involved in the inter-cell interference between the local cell and the adjacent cell.

4). The base station device of 2) or 3), wherein the processing circuitry is further configured to: receive, from a first UE in the local cell, a measurement report for the interference from the adjacent cell; determine a particular transmitting beam corresponding to the first UE to be a conflicting beam; and store, in the conflicting beam list, a beam index of the particular transmitting beam.

5). The base station device of 4), wherein the processing circuitry is further configured to: send, to the base station of the adjacent cell, time information about when the interference from the adjacent cell is measured by the first UE, such that the base station of the adjacent cell is enabled to determine an adjacent-cell beam interfering the first UE based on the time information.

6). The base station device of 2) or 3), wherein the processing circuitry is further configured to: receive, from the base station of the adjacent cell, time information about when an interference from the local cell is measured by a second UE in the adjacent cell; based on the time information, determine a particular transmitting beam of the local cell interfering the second UE; determine the particular transmitting beam to be a conflicting beam; and store, in the conflicting beam list, a beam index of the particular transmitting beam.

7). The base station device of 6), wherein the processing circuitry is further configured to: receive, from the base station of the adjacent cell, a beam index of an adjacent-cell beam corresponding to the second UE; and store, in the conflicting beam list, the beam index of the adjacent-cell beam in correspondence to the beam index of the particular transmitting beam.

8). The base station device of 5) or 7), wherein the processing circuitry is further configured to send the beam index of the particular transmitting beam to the base station of the adjacent cell.

9). The base station device of 1), wherein the time-frequency resources include a set of time-domain resources or a set of frequency-domain resources within the future specific period.

10). The base station device of 9), wherein the beam scheduling information includes information on a time-domain resource or a frequency-domain resource allocated to each of the one or more transmitting beams.

11). The base station device of 9), wherein the beam scheduling information comprises: information about which end of the set of time-domain resources the time-domain resource allocated to the at least one conflicting beam is close to, or information about which end of the set of frequency-domain resources the frequency-domain resource allocated to the at least one conflicting beam is close to.

12). The base station device of 1), wherein the beam scheduling information includes at least a beam index of the at least one conflicting beam.

13). The base station device of 10), wherein the beam scheduling information describes, in a form of bitmap, the time-domain resources or the frequency-domain resources allocated to the at least one conflicting beam and other transmitting beams of the one or more transmitting beams.

14). The base station device of 11), wherein the processing circuitry is configured to: for a particular conflicting beam of the at least one conflicting beam, the time-frequency resource for the particular conflicting beam is always allocated close to a fixed end of the set of time-domain resources or of the set of frequency-domain resources.

15). A base station device, comprising a processing circuitry configured to receive beam scheduling information for a future specific period from a base station of an adjacent cell, the beam scheduling information including information on time-frequency resources allocated to at least one adjacent-cell beam by the adjacent cell; based on a conflicting beam list, determine that at least one conflicting beam associated with the at least one adjacent-cell beam is included in a set of transmitting beams to be used for downlink transmission from a local cell in the future specific period; and in response to the determining, based on the beam scheduling information, allocate time-frequency resources to the at least one conflicting beam.

16). The base station device of 15), wherein the conflicting beam list indicates a set of conflicting beams of the local cell involved in an inter-cell interference between the local cell and the adjacent cell.

17). The base station device of 15), wherein the conflicting beam list further indicates a set of conflicting beams of the adjacent cell involved in the inter-cell interference between the local cell and the adjacent cell.

18). The base station device of 16) or 17), wherein the processing circuitry is further configured to: receive, from a first UE in the local cell, a measurement report for the interference from the adjacent cell; determine a particular transmitting beam corresponding to the first UE to be a conflicting beam; and store, in the conflicting beam list, a beam index of the particular transmitting beam.

19). The base station device of 18), wherein the processing circuitry is further configured to: send, to the base station of the adjacent cell, time information about when the interference from the adjacent cell is measured by the first UE, such that the base station of the adjacent cell is enabled to determine an adjacent-cell beam interfering the first UE based on the time information.

20). The base station device of 16) or 17), wherein the processing circuitry is further configured to: receive, from the base station of the adjacent cell, time information when an interference from the local cell is measured by a second UE in the adjacent cell; based on the time information, determine a particular transmitting beam of the local cell interfering the second UE; determine the particular transmitting beam to be a conflicting beam; and store, in the conflicting beam list, a beam index of the particular transmitting beam.

21). The base station device of 20), wherein the processing circuitry is further configured to: receive, from the base station of the adjacent cell, a beam index of the adjacent-cell beam corresponding to the second UE in the adjacent cell; and store, in the conflicting beam list, the beam index of the adjacent-cell beam in correspondence to the beam index of the particular transmitting beam.

22). The base station device of 19) or 21), wherein the processing circuitry is further configured to send the beam index of the particular transmitting beam to the base station of the adjacent cell.

23). The base station device of 15), wherein time-frequency resources include a set of time-domain resources or a set of frequency-domain resources within the future specific period.

24). The base station device of 23), wherein the beam scheduling information includes information on a time-domain resource or a frequency-domain resource allocated to each of the one or more transmitting beams.

25). The base station device of 23), wherein the beam scheduling information comprises: information about which end of the set of time-domain resources the time-domain resource allocated to the at least one conflicting beam is close to, or information about which end of the set of frequency-domain resources the frequency-domain resource allocated to the at least one conflicting beam is close to.

26). The base station device of 15), wherein the beam scheduling information includes at least a beam index of the at least one conflicting beam.

27). The base station device of 15), wherein the beam scheduling information describes, in a form of bitmap, the time-domain resources or the frequency-domain resources allocated to the at least one conflicting beam and other transmitting beams of the one or more transmitting beams.

28). The base station device of 16), wherein the processing circuitry is configured to: allocate a time-frequency resource to each of the at least conflicting beam, such that the time-frequency resource allocated to the conflicting beam is different from those allocated to the at least one adjacent-cell beam as indicated in the beam scheduling information.

29). The base station device of 17), wherein the beam scheduling information includes at least a beam index of the at least one adjacent-cell beam, and wherein the processing circuitry is configured to allocate time-frequency resource to each of the at least one conflicting beam, such that the time-frequency resource allocated to the conflicting beam is different from the time-frequency resources, as indicated in the beam scheduling information, allocated to the adjacent-cell beams corresponding to the conflicting beam in the conflicting beam list.

30). The base station device of 25), wherein the processing circuitry is configured to, for a conflicting beam among the at least one conflicting beam which is corresponding to a particular adjacent-cell beam in the at least one adjacent-cell beam: when the time-domain resource allocated to the particular adjacent-cell beam is close to one end of the set of time-domain resources, allocate time-domain resource close to the other end of the set of time-domain resources to the conflicting beam; or when the frequency-domain resource allocated to the particular adjacent-cell beam is close to one end of the set of frequency-domain resources, allocate frequency-domain resource close to the other end of the set of frequency-domain resources to the conflicting beam.

31). A wireless communication system, comprising: UE; a first base station; and a second base station, wherein the UE is connected to a first cell corresponding to the first base station and interfered by a second cell corresponding to the second base station, wherein the first base station, based on a conflicting beam list, determines that at least one first transmitting beam to be used for downlink transmission to the UE in a future specific period is a conflicting beam; in response to the determining, sends beam scheduling information for the future specific period to the second base station, the beam scheduling information including at least information on time-frequency resources allocated to the at least one first transmitting beam by the first cell, and wherein the second base station receives the beam scheduling information from the first base station; based on a conflicting beam list of the second cell, determines that at least one second transmitting beam to be used for downlink transmission from the second cell in the future specific period is a conflicting beam associated with the at least one first transmitting beam; and in response to the determining, based on the beam scheduling information, allocates time-frequency resources to the at least one second transmitting beam.

32). The wireless communication system of 31), wherein the second base station allocates, to each of the second transmitting beams, a time-frequency resource different from those allocated to corresponding first transmitting beam.

33). A communication method, comprising: based on a conflicting beam list, determining that at least one conflicting beam is included in a set of transmitting beams to be used for downlink transmission from a local cell in a future specific period; in response to the determining, sending beam scheduling information for the future specific period to a base station of an adjacent cell, the beam scheduling information including at least information on time-frequency resources allocated to the at least one conflicting beam by the local cell.

34). A communication method, comprising: receiving beam scheduling information for a future specific period from a base station of an adjacent cell, the beam scheduling information including information on time-frequency resources allocated to at least one adjacent-cell beam by the adjacent cell; based on a conflicting beam list, determining that at least one conflicting beam associated with the at least one adjacent-cell beam is included in a set of transmitting beams to be used for downlink transmission from a local cell in the future specific period; and in response to the determining, based on the beam scheduling information, allocating time-frequency resources to the at least one conflicting beam.

35). A non-transitory computer readable storage medium storing executable instructions which, when executed, perform the communication method according to 33) or 34).

Application Examples of the Present Disclosure

The technology of the present disclosure can be applied to various products.

For example, the electronic device 100 according to the embodiments of the present disclosure can be implemented as a variety of base stations or installed in a variety of base stations, and the electronic device 200 can be implemented as a variety of user equipment or installed in a variety of user equipment.

The communication method according to the embodiments of the present disclosure may be implemented by various base stations or user equipment; the methods and operations according to the embodiments of the present disclosure may be embodied as computer-executable instructions, stored in a non-transitory computer-readable storage medium, and can be performed by various base stations or user equipment to implement one or more of the above-mentioned functions.

The technology according to the embodiments of the present disclosure can be made into various computer program products, which can be used in various base stations or user equipment to implement one or more of the above-mentioned functions.

The base stations mentioned in the present disclosure can be implemented as any type of base station, preferably, such as the macro gNB or ng-eNB defined in the 3GPP 5G NR standard. A gNB may be a gNB that covers a cell smaller than a macro cell, such as a pico gNB, a micro gNB, and a home (femto) gNB. Instead, the base station may be implemented as any other type of base station such as a NodeB, an eNodeB and a base transceiver station (BTS). The base station may include a main body configured to control wireless communication, and one or more remote radio heads (RRH) disposed in a different place from the main body, a wireless relay, a drone control tower, main control unit in an automated factory or the like.

The user equipment may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The terminal device may also be implemented as a terminal (also called a machine type communication (MTC) terminal) that performs machine-to-machine (M2M) communication, a drone, a sensor or actuator in an automated factory or the like. Furthermore, the terminal device may be a wireless communication module (such as an integrated circuit module including a single die) mounted on each of the above terminals.

Examples of the base station and the user equipment to which the present disclosure can be applied will be described briefly below.

It should be understood that the term "base station" used in this disclosure has the full breadth of its usual meaning, and includes at least a wireless communication station used as a part of a wireless communication system or a radio system to facilitate communication. Examples of base stations may be, for example, but not limited to the following: one or both of a base transceiver station (BTS) and a base station controller (BSC) in a GSM communication system; one or both of a radio network controller (RNC) and NodeB in a 3G communication system; eNB in the 4G LTE and LTE-A system; gNB and ng-eNB in the 5G communication system In D2D, M2M, and V2V communication scenarios, a logical entity that has a function of controlling communication can also be called a base station. In the cognitive radio communication scenario, a logical entity that plays a role of spectrum coordination can also be called a base station. In an automated factory, a logical entity that provides a network control function can be called a base station.

First Application Example of Base Station

Figure 23:
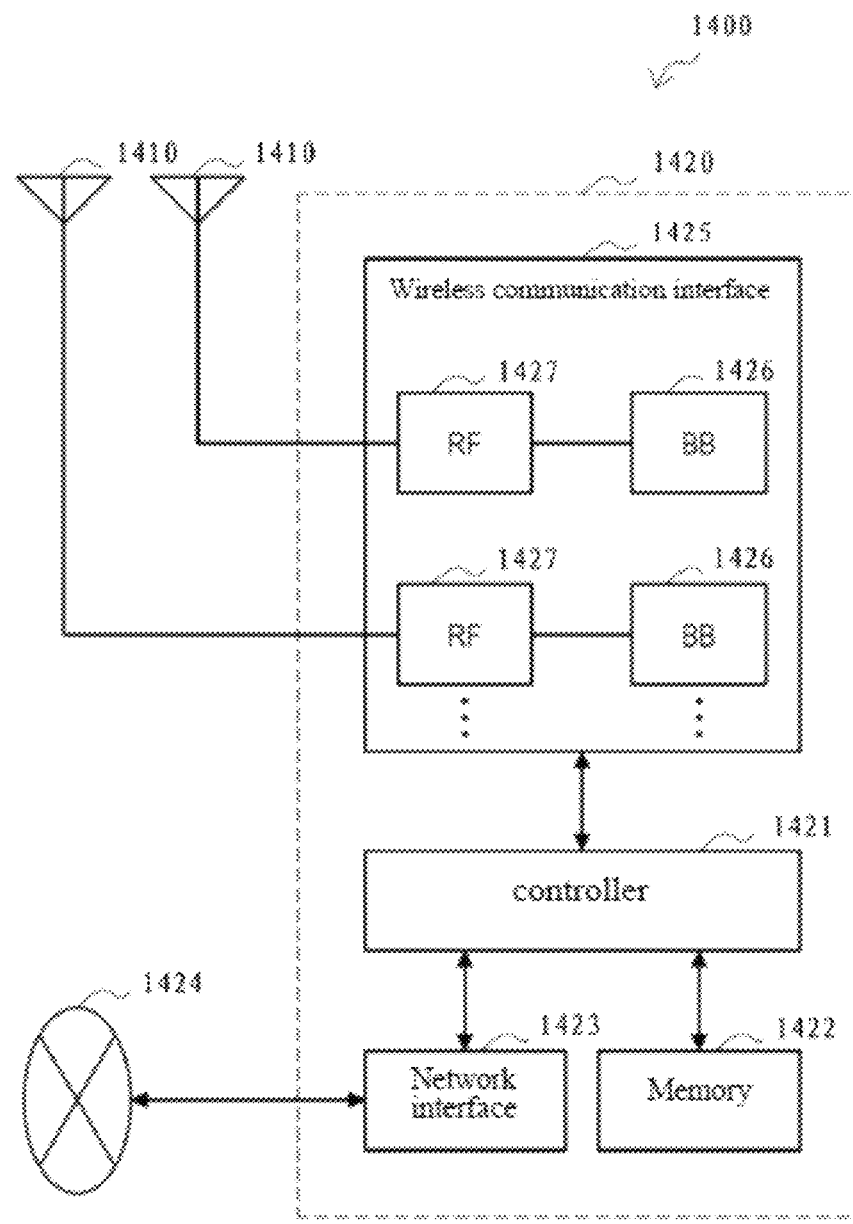
FIG. 23 illustrates a first example of schematic configuration of the base station according to the present disclosure.

FIG. 23 is a block diagram showing a first example of a schematic configuration of a base station to which the technology of the present disclosure can be applied. In FIG. 23, the base station is implemented as gNB 1400. The gNB 1400 includes a plurality of antennas 1410 and a base station device 1420. The base station device 1420 and each antenna 1410 may be connected to each other via an RF cable. In an implementation, the gNB 1400 (or the base station device 1420) herein may correspond to the above-mentioned electronic device 100 or base station device 200.

The antennas 1410 includes multiple antenna elements, such as multiple antenna arrays for large-scale MIMO. The antennas 1410, for example, can be arranged into the antenna array matrix, and are used for the base station device 1420 to transmit and receive wireless signals. For example, multiple antennas 1410 may be compatible with multiple frequency bands used by gNB 1400.

The base station device 1420 includes a controller 1421, a memory 1422, a network interface 1423, and a wireless communication interface 1425.

The controller 1421 may be, for example, a CPU or a DSP, and operates various functions of the base station device 1420 at a higher layer. For example, the controller 1421 may include the processing circuitry 101 or 201 described above, perform the communication method described in FIG. 4B or 5B, or control various components of the base station device 100 or 200. For example, the controller 1421 generates data packets based on data in signals processed by the wireless communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424 (for example, 5G core network). The controller 1421 may communicate with a core network node or another gNB via the network interface 1423. In this case, the gNB 1400 and the core network node or other gNBs may be connected to each other through a logical interface such as an Si interface and an X2 interface. The network interface 1423 may also be a wired communication interface or a wireless communication interface for a wireless backhaul line. If the network interface 1423 is a wireless communication interface, compared with the frequency band used by the wireless communication interface 1425, the network interface 1423 can use a higher frequency band for wireless communication.

The wireless communication interface 1425 supports any cellular communication scheme such as 5G NR, and provides a wireless connection to a terminal located in a cell of the gNB 1400 via an antenna 1410. The wireless communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as L1, Medium Access Control (MAC), Radio Link Control (RLC), and Packet Data Convergence Protocol (PDCP). As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 23 illustrates an example in which one RF circuit 1427 is connected to one antenna 1410, the present disclosure is not limited to this illustration, but one RF circuit 1427 may be connected to multiple antennas 1410 at the same time.

As shown in FIG. 23, the wireless communication interface 1425 may include a plurality of BB processors 1426. For example, the plurality of BB processors 1426 may be compatible with multiple frequency bands used by gNB 1400. As shown in FIG. 23, the wireless communication interface 1425 may include a plurality of RF circuits 1427. For example, the plurality of RF circuits 1427 may be compatible with multiple antenna elements. Although FIG. 23 shows an example in which the wireless communication interface 1425 includes a plurality of BB processors 1426 and a plurality of RF circuits 1427, the wireless communication interface 1425 may also include a single BB processor 1426 or a single RF circuit 1427.

In the gNB 1400 illustrated in FIG. 23, one or more of the units (the beam scheduling information sending unit 103, the beam scheduling information receiving unit 202) included in the processing circuitry 101 described with reference to FIG. 4A, or the processing circuitry 201 described with reference to FIG. 5A may be implemented in the radio communication interface 1425. Alternatively, at least a part of these components may be implemented in the controller 1421. As an example, the gNB 1400 includes a part (for example, the BB processor 1426) or the entire of the radio communication interface 1425 and/or a module including the controller 1421, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 1400, and the radio communication interface 1425 (for example, the BB processor 1426) and/or the controller 1421 may execute the program. As described above, as a device including the one or more components, the gNB 1400, the base station device 1420 or the module may be provided. In addition, a readable medium in which the program is recorded may be provided.

Second Application Example of Base Station

Figure 24:
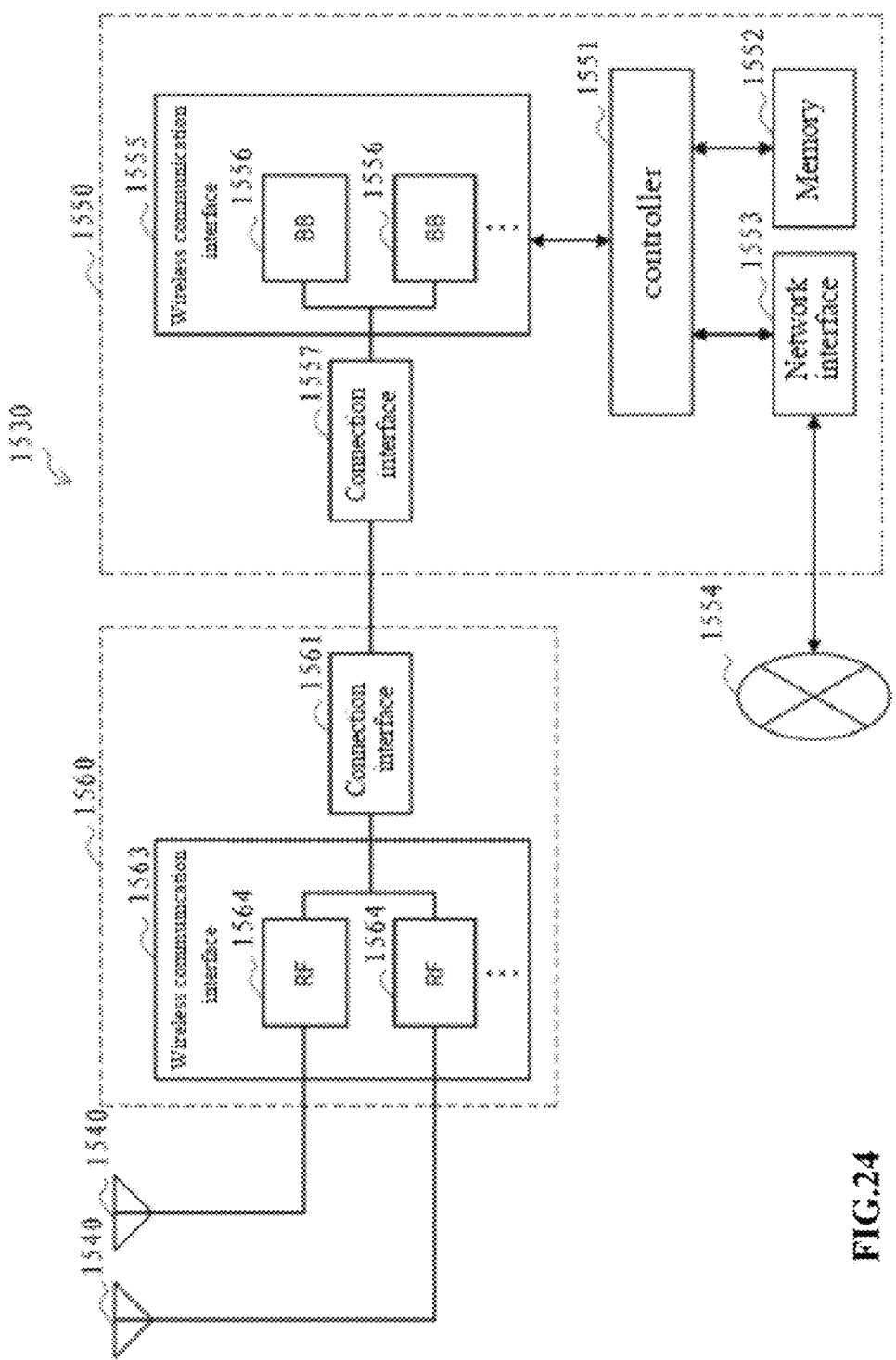
FIG. 24 illustrates a second example of schematic configuration of the base station according to the present disclosure.

FIG. 24 is a block diagram showing a second example of a schematic configuration of a base station to which the technology of the present disclosure can be applied. In FIG. 24, the base station is shown as gNB 1530. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to the foregoing base station device 100 or base station device 200.

The antennas 1540 include multiple antenna elements, such as multiple antenna arrays for large-scale MIMO. The antennas 1540, for example, can be arranged into the antenna array matrix, and are used for the base station device 1550 to transmit and receive wireless signals. For example, multiple antennas 1540 may be compatible with multiple frequency bands used by gNB 1530.

The base station device 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 23.

The wireless communication interface 1555 supports any cellular communication scheme such as 5G NR, and provides wireless communication to a terminal located in a sector corresponding to the RRH 1560 via the RRH 1560 and the antenna 1540. The wireless communication interface 1555 may typically include, for example, a BB processor 1556. The BB processor 1556 is the same as the BB processor 1426 described with reference to FIG. 23 except that the BB processor 1556 is connected to the RF circuit 1564 of the RRH 1560 via the connection interface 1557. As shown in FIG. 24, the wireless communication interface 1555 may include a plurality of BB processors 1556. For example, multiple BB processors 1556 may be compatible with multiple frequency bands used by gNB 1530. Although FIG. 24 shows an example in which the wireless communication interface 1555 includes a plurality of BB processors 1556, the wireless communication interface 1555 may also include a single BB processor 1556.

The connection interface 1557 is an interface for connecting the base station device 1550 (wireless communication interface 1555) to the RRH 1560. The connection interface 1557 may also be a communication module for communication in the above-mentioned high-speed line connecting the base station device 1550 (wireless communication interface 1555) to the RRH 1560.

The RRH 1560 includes a connection interface 1561 and a wireless communication interface 1563.

The connection interface 1561 is an interface for connecting the RRH 1560 (wireless communication interface 1563) to the base station device 1550. The connection interface 1561 may also be a communication module for communication in the above-mentioned high-speed line.

The wireless communication interface 1563 transmits and receives wireless signals via the antenna 1540. The wireless communication interface 1563 may generally include, for example, an RF circuit 1564. The RF circuit 1564 may include, for example, a mixer, a filter, and an amplifier, and transmits and receives wireless signals via the antenna 1540. Although FIG. 24 illustrates an example in which one RF circuit 1564 is connected to one antenna 1540, the present disclosure is not limited to this illustration, but one RF circuit 1564 may be connected to multiple antennas 1540 at the same time.

As shown in FIG. 24, the wireless communication interface 1563 may include a plurality of RF circuits 1564. For example, the plurality of RF circuits 1564 may support multiple antenna elements. Although FIG. 24 shows an example in which the wireless communication interface 1563 includes a plurality of RF circuits 1564, the wireless communication interface 1563 may include a single RF circuit 1564.

In the gNB 1500 shown in FIG. 24, one or more of units (e.g., the beam scheduling information sending unit 103, the beam scheduling information receiving unit 202) included in the processing circuitry 101 described with reference to FIG. 4A, or the processing circuitry 201 described with reference to FIG. 5A may be implemented in the wireless communication interface 1525. Alternatively, at least a part of these components may be implemented in the controller 1521. For example, the gNB 1500 includes a part (for example, the BB processor 1526) or the whole of the wireless communication interface 1525, and/or a module including the controller 1521, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 1500, and the wireless communication interface 1525 (for example, the BB processor 1526) and/or the controller 1521 may execute the program. As described above, as a device including one or more components, the gNB 1500, the base station device 1520, or a module may be provided, and a program for allowing the processor to function as one or more components may be provided. In addition, a readable medium in which the program is recorded may be provided.

First Application Example of User Equipment

Figure 25:
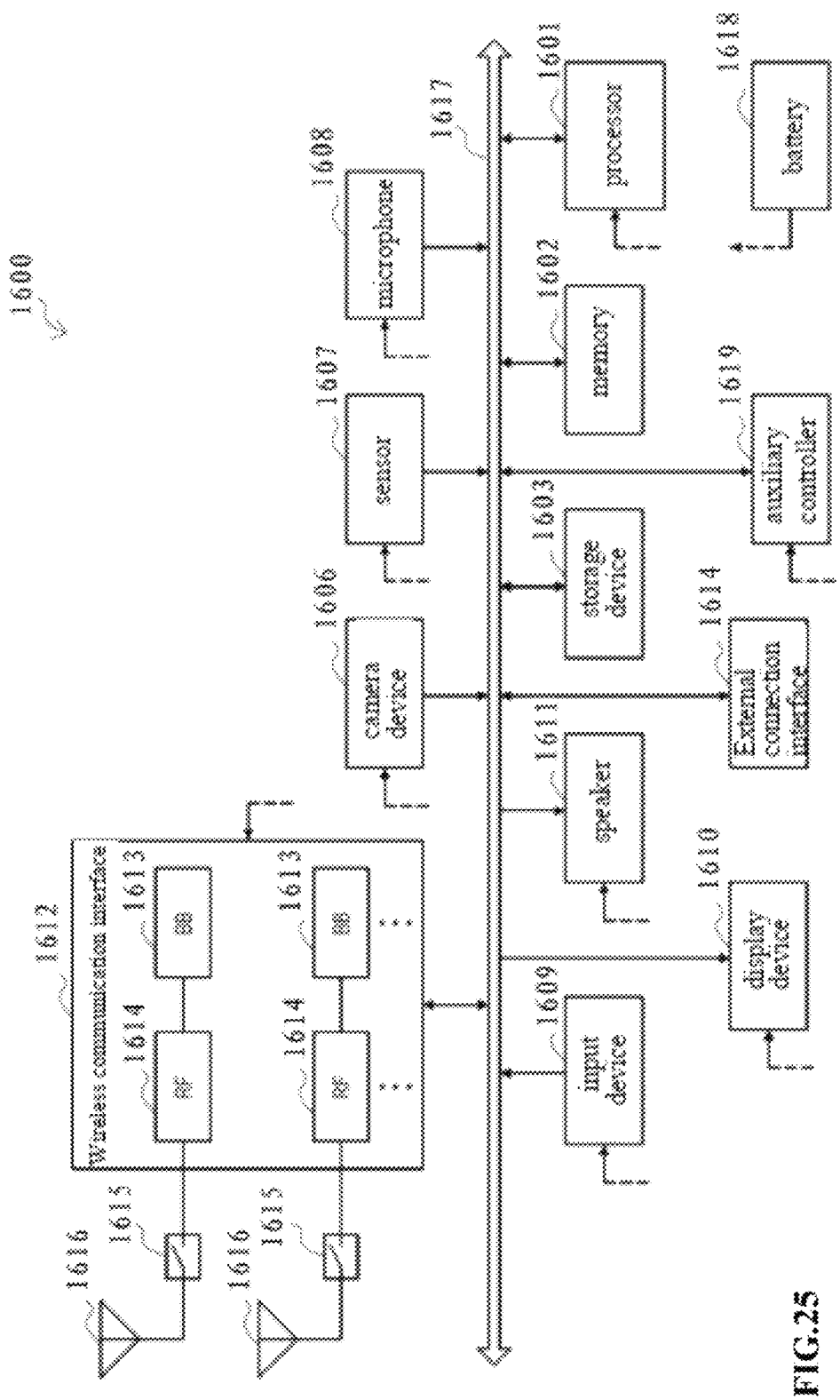
FIG. 25 illustrates an example of schematic configuration of a smart phone according to the present disclosure.

FIG. 25 is a block diagram showing an example of a schematic configuration of a smartphone 1600 to which the technology of the present disclosure can be applied. In an example, the smart phone 1600 may be implemented as the UE described in the present disclosure.

The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a wireless communication interface 1612, one or more antenna switches 1615, one or more antennas 1616, a bus 1617, a battery 1618, and an auxiliary controller 1619.

The processor 1601 may be, for example, a CPU or a system on chip (SoC), and controls functions of an application layer and another layer of the smartphone 1600. The memory 1602 includes a RAM and a ROM, and stores data and programs executed by the processor 1601. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The wireless communication interface 1612 supports any cellular communication scheme such as 4G LTE, 5G NR or the like, and performs wireless communication. The wireless communication interface 1612 may generally include, for example, a BB processor 1613 and an RF circuit 1614. The BB processor 1613 may perform, for example, encoding/decoding, modulation/demodulation, and multiplexing/demultiplexing, and perform various types of signal processing for wireless communication. Meanwhile, the RF circuit 1614 may include, for example, a mixer, a filter, and an amplifier, and transmits and receives wireless signals via the antenna 1616. The wireless communication interface 1612 may be a chip module on which a BB processor 1613 and an RF circuit 1614 are integrated. As shown in FIG. 25, the wireless communication interface 1612 may include multiple BB processors 1613 and multiple RF circuits 1614. Although FIG. 25 illustrates an example in which the wireless communication interface 1612 includes a plurality of BB processors 1613 and a plurality of RF circuits 1614, the wireless communication interface 1612 may also include a single BB processor 1613 or a single RF circuit 1614.

In addition, in addition to the cellular communication scheme, the wireless communication interface 1612 may support other types of wireless communication scheme, such as a short-range wireless communication scheme, a near field communication scheme, and a wireless local area network (LAN) scheme. In this case, the wireless communication interface 1612 may include a BB processor 1613 and an RF circuit 1614 for each wireless communication scheme.

Each of the antenna switches 1615 switches a connection destination of the antenna 1616 between a plurality of circuits included in the wireless communication interface 1612 (for example, circuits for different wireless communication schemes).

The antennas 1616 includes multiple antenna elements, such as multiple antenna arrays for large-scale MIMO. The antennas 1616, for example, can be arranged into the antenna array matrix, and are used for the wireless communication interface 1612 to transmit and receive wireless signals. The smart phone 1600 can includes one or more antenna panels (not shown).

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the wireless communication interface 1612, and the auxiliary controller 1619 to each other. The battery 1618 supplies power to each block of the smartphone 1600 shown in FIG. 25 via a feeder, and the feeder is partially shown as a dotted line in the figure. The auxiliary controller 1619 operates the minimum necessary functions of the smartphone 1600 in the sleep mode, for example.

In the smart phone 1600 shown in FIG. 25, one or more of units included in the processing circuitry may be implemented in the wireless communication interface 1612. Alternatively, at least a part of these components may be implemented in the processor 1601 or the auxiliary controller 1619. As an example, the smart phone 1600 includes a part (for example, the BB processor 1613) or the whole of the wireless communication interface 1612, and/or a module including the processor 1601 and/or the auxiliary controller 1619, and one or more components may be Implemented in this module. In this case, the module may store a program that allows processing to function as one or more components (in other words, a program for allowing the processor to perform operations of one or more components), and may execute the program. As another example, a program for allowing the processor to function as one or more components may be installed in the smart phone 1600, and the wireless communication interface 1612 (for example, the BB processor 1613), the processor 1601, and/or the auxiliary The controller 1619 can execute this program. As described above, as a device including one or more components, a smart phone 1600 or a module may be provided, and a program for allowing a processor to function as one or more components may be provided. In addition, a readable medium in which the program is recorded may be provided.

Second Application Example of User Equipment

Figure 26:
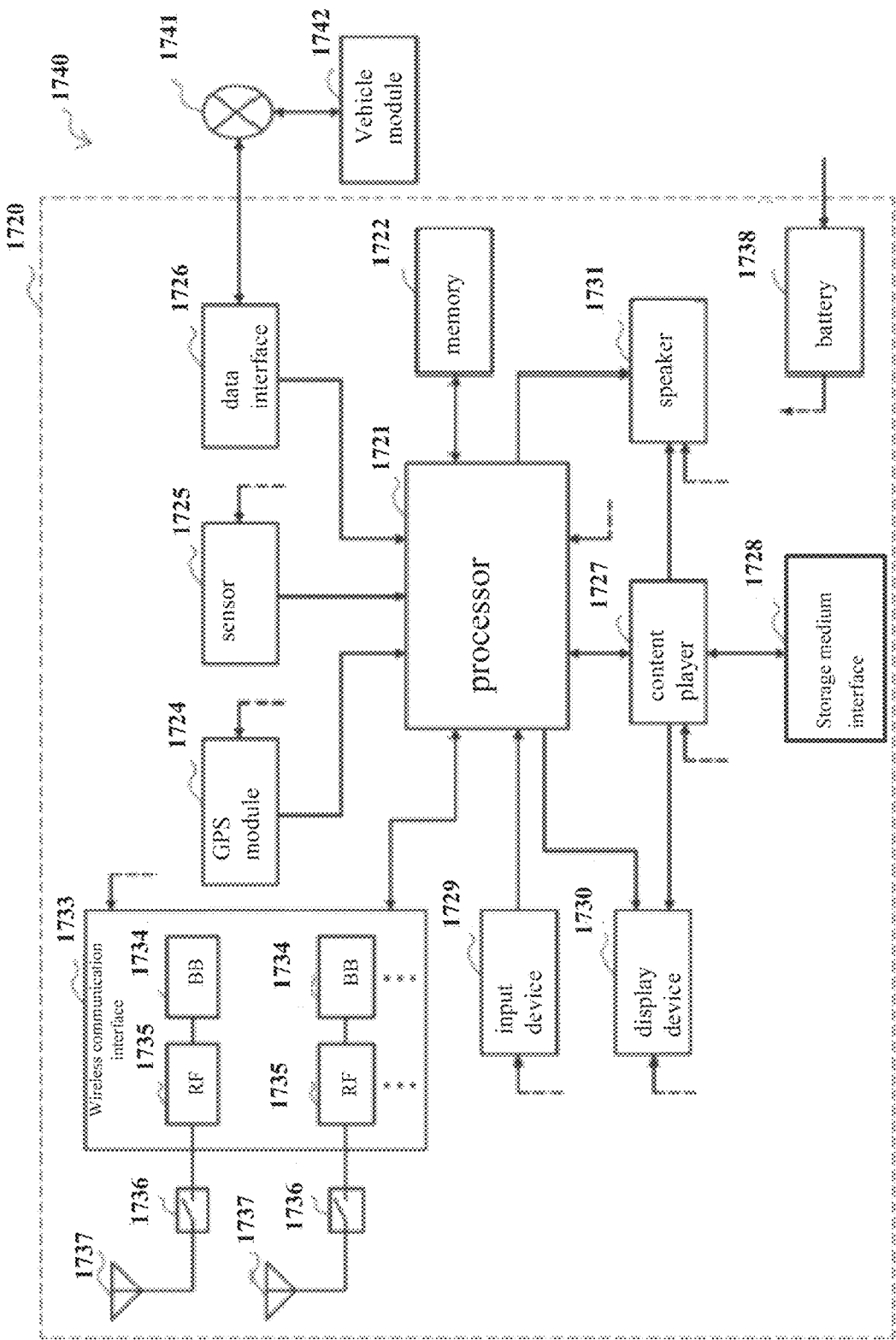
FIG. 26 illustrates an example of schematic configuration of an automobile navigation device according to the present disclosure.

FIG. 26 is a block diagram showing an example of a schematic configuration of a car navigation device 1720 to which the technology of the present disclosure can be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a wireless communication interface 1733, one or more antenna switches 1736, one or more antennas 1737, and a battery 1738.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content player 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The wireless communication interface 1733 supports any cellular communication scheme such as 4G LTE or 5G NR, and performs wireless communication. The wireless communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The wireless communication interface 1733 may also be a chip module on which a BB processor 1734 and an RF circuit 1735 are integrated. As shown in FIG. 26, the wireless communication interface 1733 may include a plurality of BB processors 1734 and a plurality of RF circuits 1735. Although FIG. 26 shows an example in which the wireless communication interface 1733 includes a plurality of BB processors 1734 and a plurality of RF circuits 1735, the wireless communication interface 1733 may also include a single BB processor 1734 or a single RF circuit 1735.

In addition, in addition to the cellular communication scheme, the wireless communication interface 1733 may support other types of wireless communication scheme, such as a short-range wireless communication scheme, a near field communication scheme, and a wireless LAN scheme. In this case, the wireless communication interface 1733 may include a BB processor 1734 and an RF circuit 1735 for each wireless communication scheme.

Each of the antenna switches 1736 switches the connection destination of the antenna 1737 between a plurality of circuits included in the wireless communication interface 1733, such as circuits for different wireless communication schemes.

The antennas 1737 includes multiple antenna elements, such as multiple antenna arrays for large-scale MIMO. The antennas 1737, for example, can be arranged into the antenna array matrix, and are used for the wireless communication interface 1733 to transmit and receive wireless signals.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 26 via a feeder, and the feeder is partially shown as a dotted line in the figure. The battery 1738 accumulates power provided from the vehicle.

In the car navigation device 1720 shown in FIG. 26, one or more of units included in the processing circuitry can be implemented in the wireless communication interface 1733. Alternatively, at least a part of these components may be implemented in the processor 1721. As an example, the car navigation device 1720 includes a part (for example, the BB processor 1734) or the whole of the wireless communication interface 1733, and/or a module including the processor 1721, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the car navigation device 1720, and the wireless communication interface 1733 (for example, the BB processor 1734) and/or the processor 1721 may Execute the procedure. As described above, as a device including one or more components, a car navigation device 1720 or a module may be provided, and a program for allowing the processor to function as one or more components may be provided. In addition, a readable medium in which the program is recorded may be provided.

The technology of the present disclosure may also be implemented as an in-vehicle system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. A base station device, comprising:
   a processing circuitry configured to:
   based on a conflicting beam list, determine that at least one conflicting beam is included in a set of transmitting beams to be used for downlink transmission from a local cell in a future specific period;
   in response to the determining, send beam scheduling information for the future specific period to a base station of an adjacent cell, the beam scheduling information including at least information on time-frequency resources allocated to the at least one conflicting beam by the local cell,
   wherein the conflicting beam list indicates a set of conflicting beams of the local cell involved in an inter-cell interference between the local cell and the adjacent cell, and
   wherein the processing circuitry is further configured to:
   receive, from the base station of the adjacent cell, time information about when an interference from the local cell is measured by a second UE in the adjacent cell;
   based on the time information, determine a particular transmitting beam of the local cell interfering the second UE;
   determine the particular transmitting beam to be a conflicting beam; and
   store, in the conflicting beam list, a beam index of the particular transmitting beam.

2. The base station device of claim 1, wherein the conflicting beam list further indicates a set of conflicting beams of the adjacent cell involved in the inter-cell interference between the local cell and the adjacent cell.

3. The base station device of claim 1, wherein the processing circuitry is further configured to:
   receive, from the base station of the adjacent cell, a beam index of an adjacent-cell beam corresponding to the second UE; and
   store, in the conflicting beam list, the beam index of the adjacent-cell beam in correspondence to the beam index of the particular transmitting beam.

4. The base station device of claim 1, wherein the time-frequency resources include a set of time-domain resources or a set of frequency-domain resources within the future specific period.

5. The base station device of claim 4, wherein the beam scheduling information includes information on a time-domain resource or a frequency-domain resource allocated to each of the one or more transmitting beams.

6. The base station device of claim 5, wherein the beam scheduling information describes, in a form of bitmap, the time-domain resources or the frequency-domain resources allocated to the at least one conflicting beam and other transmitting beams of the one or more transmitting beams.

7. The base station device of claim 4, wherein the beam scheduling information comprises: information about which end of the set of time-domain resources the time-domain resource allocated to the at least one conflicting beam is close to, or information about which end of the set of frequency-domain resources the frequency-domain resource allocated to the at least one conflicting beam is close to.

8. The base station device of claim 7, wherein the processing circuitry is configured to:
   for a particular conflicting beam of the at least one conflicting beam, the time-frequency resource for the particular conflicting beam is always allocated close to a fixed end of the set of time-domain resources or of the set of frequency-domain resources.

9. The base station device of claim 1, wherein the beam scheduling information includes at least a beam index of the at least one conflicting beam.

10. A base station device, comprising:
   a processing circuitry configured to:
   based on a conflicting beam list, determine that at least one conflicting beam is included in a set of transmitting beams to be used for downlink transmission from a local cell in a future specific period;
   in response to the determining, send beam scheduling information for the future specific period to a base station of an adjacent cell, the beam scheduling information including at least information on time-frequency resources allocated to the at least one conflicting beam by the local cell,
   wherein the conflicting beam list indicates a set of conflicting beams of the local cell involved in an inter-cell interference between the local cell and the adjacent cell, and
   receive, from a first UE in the local cell, a measurement report for the interference from the adjacent cell;
   determine a particular transmitting beam corresponding to the first UE to be a conflicting beam;
   store, in the conflicting beam list, a beam index of the particular transmitting beam; and
   send, to the base station of the adjacent cell, time information about when the interference from the adjacent cell is measured by the first UE, such that the base station of the adjacent cell is enabled to determine an adjacent-cell beam interfering the first UE based on the time information.

11. The base station device of claim 10, wherein the processing circuitry is further configured to send the beam index of the particular transmitting beam to the base station of the adjacent cell.

* * * * *